United States Patent [19]

Schmitz et al.

[11] 4,153,936
[45] May 8, 1979

[54] ENERGY MANAGEMENT SYSTEM

[75] Inventors: William D. Schmitz; Richard H. Turpin; Robert A. Dashiell; Chris L. Hadley, all of Indianapolis, Ind.

[73] Assignee: Reliance Electric Company, Cleveland, Ohio

[21] Appl. No.: 836,563

[22] Filed: Sep. 26, 1977

[51] Int. Cl.² .................. H02J 3/00; G05B 19/00; G06F 15/56
[52] U.S. Cl. .................................. 364/493; 364/107; 307/41
[58] Field of Search ............... 364/492, 107, 493, 418, 364/121, 103; 307/35, 39, 41, 52, 62; 324/103

[56] References Cited
U.S. PATENT DOCUMENTS

| | | | |
|---|---|---|---|
| 3,296,452 | 1/1967 | Williams | 235/151.21 |
| 3,652,838 | 3/1972 | Dillon et al. | 235/151.21 X |
| 3,659,114 | 4/1972 | Polenz et al. | 235/151.21 X |
| 3,697,768 | 10/1972 | Johnston | 235/151.21 X |
| 3,872,286 | 3/1975 | Putman | 235/151.21 |
| 4,023,043 | 5/1977 | Stevenson | 235/151.21 X |
| 4,034,233 | 7/1977 | Leyde | 235/151.21 X |

Primary Examiner—Edward J. Wise
Attorney, Agent, or Firm—Dressler, Goldsmith, Clement, Gordon & Shore, Ltd.

[57] ABSTRACT

A self-contained flexible multi-purpose and multi-function energy control system capable of monitoring energy consuming loads, providing signals indicative of the state thereof and for selectively energizing and de-energizing such loads in response to a variety of preselected conditions and time frames. The system is also capable of cycling the loads and of varying the cycling pattern in accordance with preestablished conditions.

15 Claims, 24 Drawing Figures

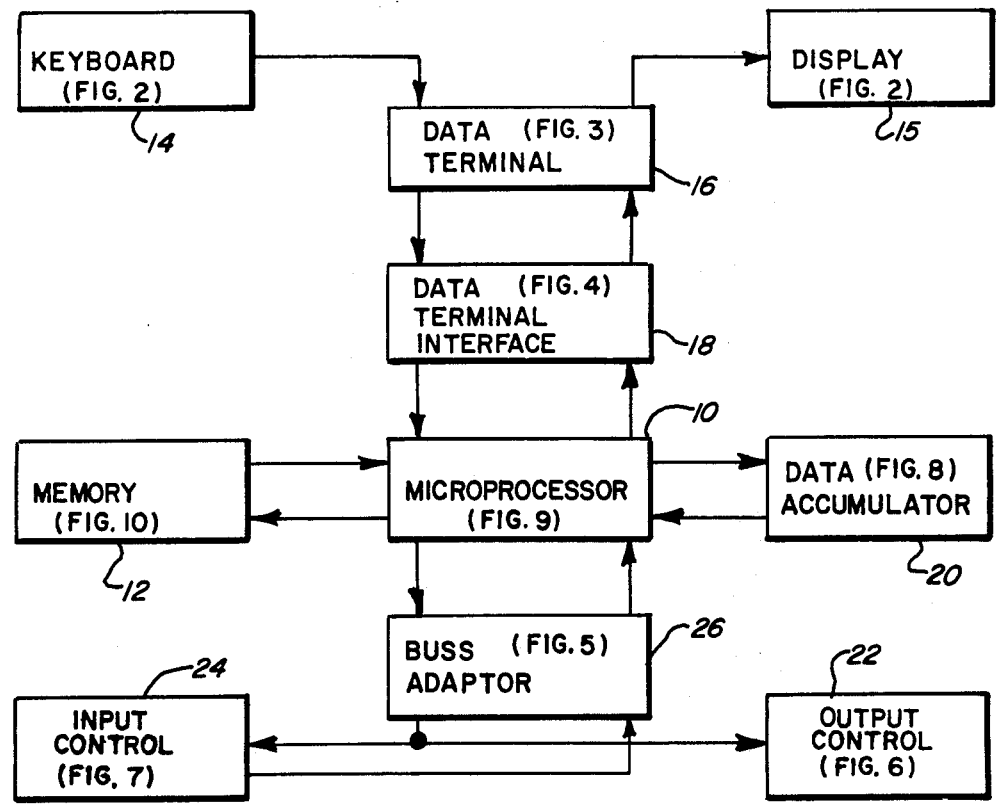
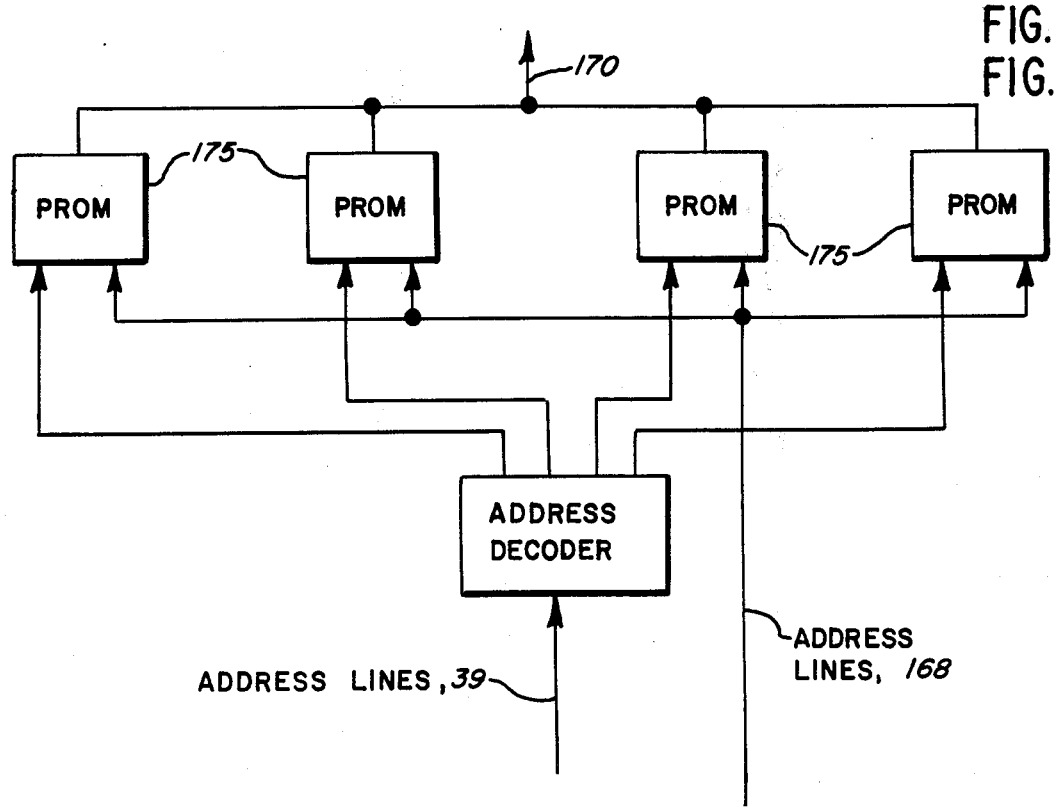
FIG. 1
FIG. 10

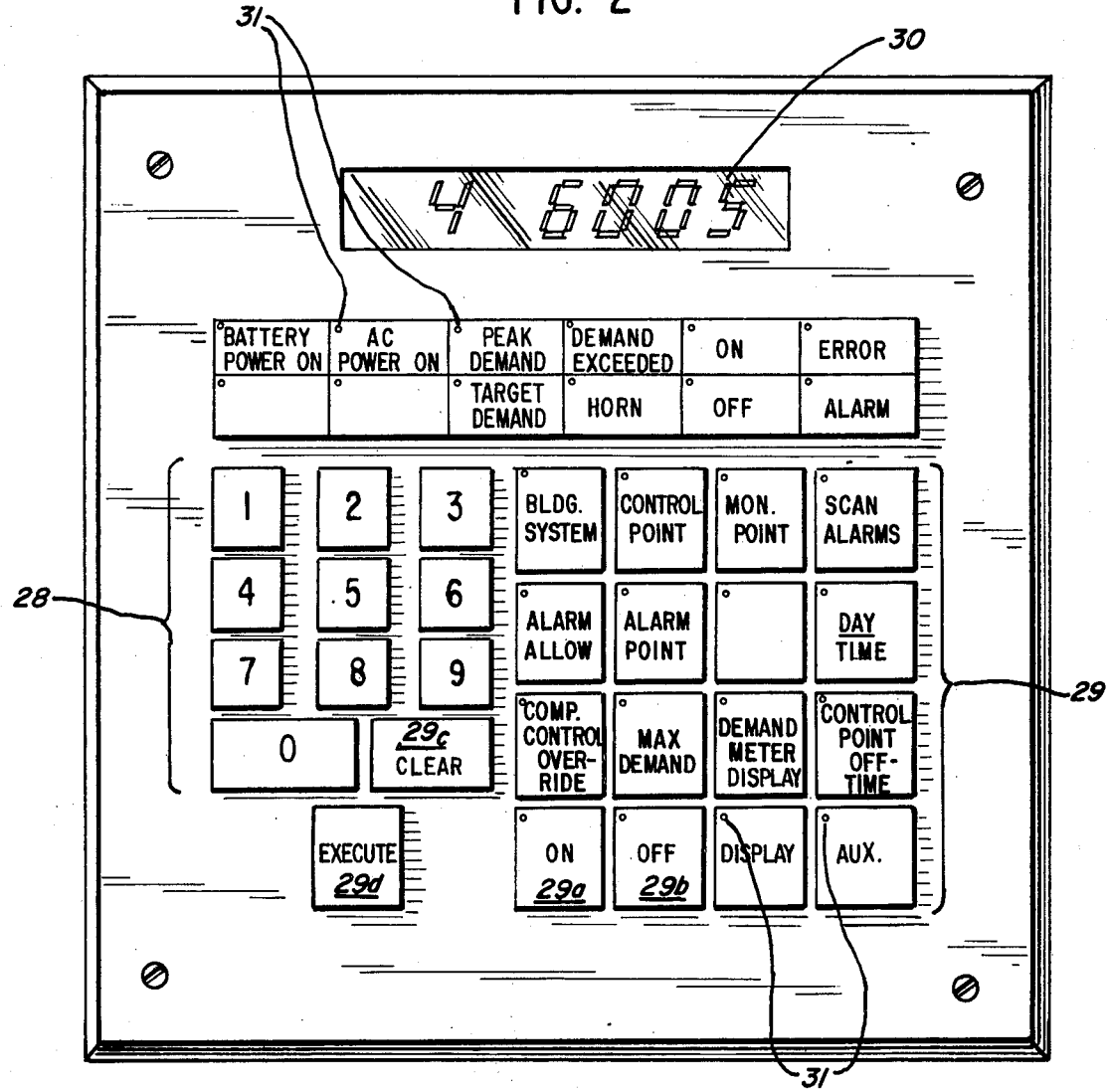
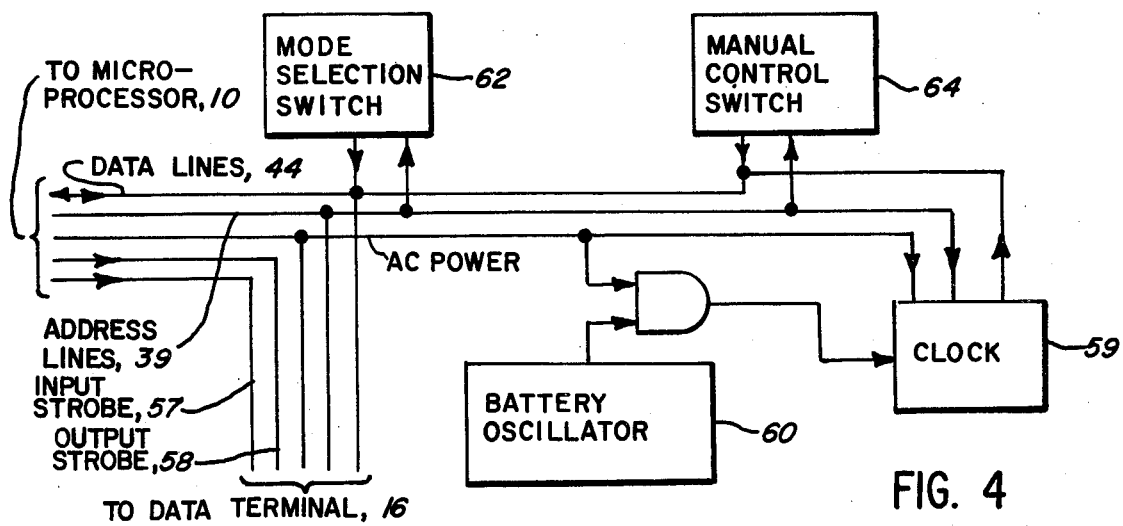

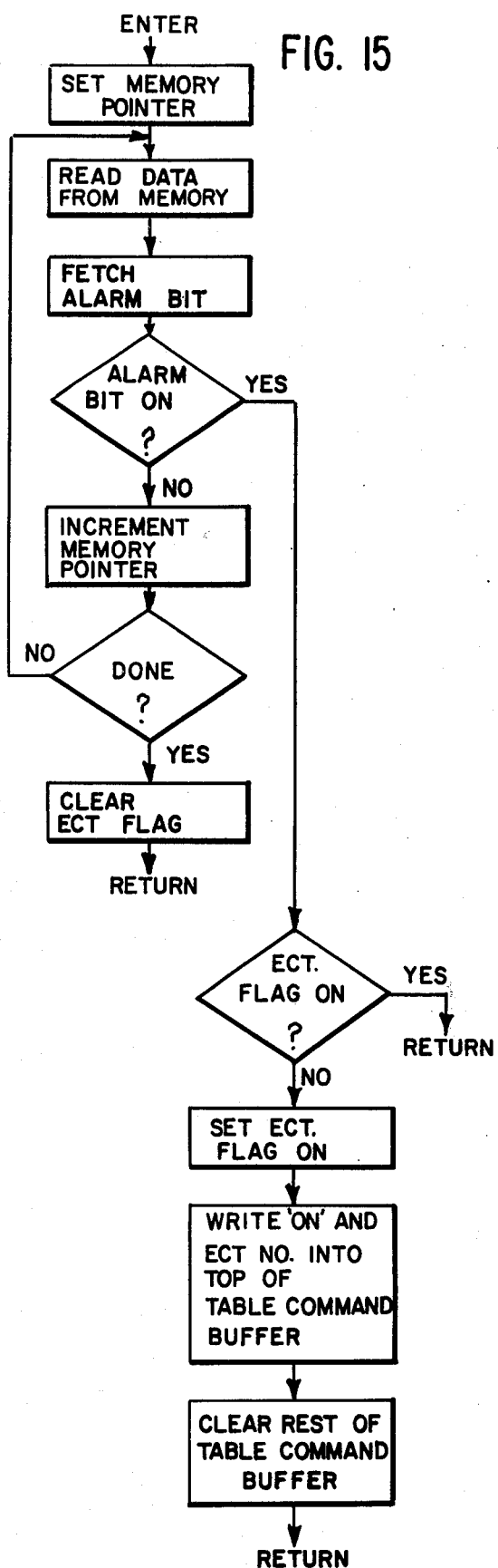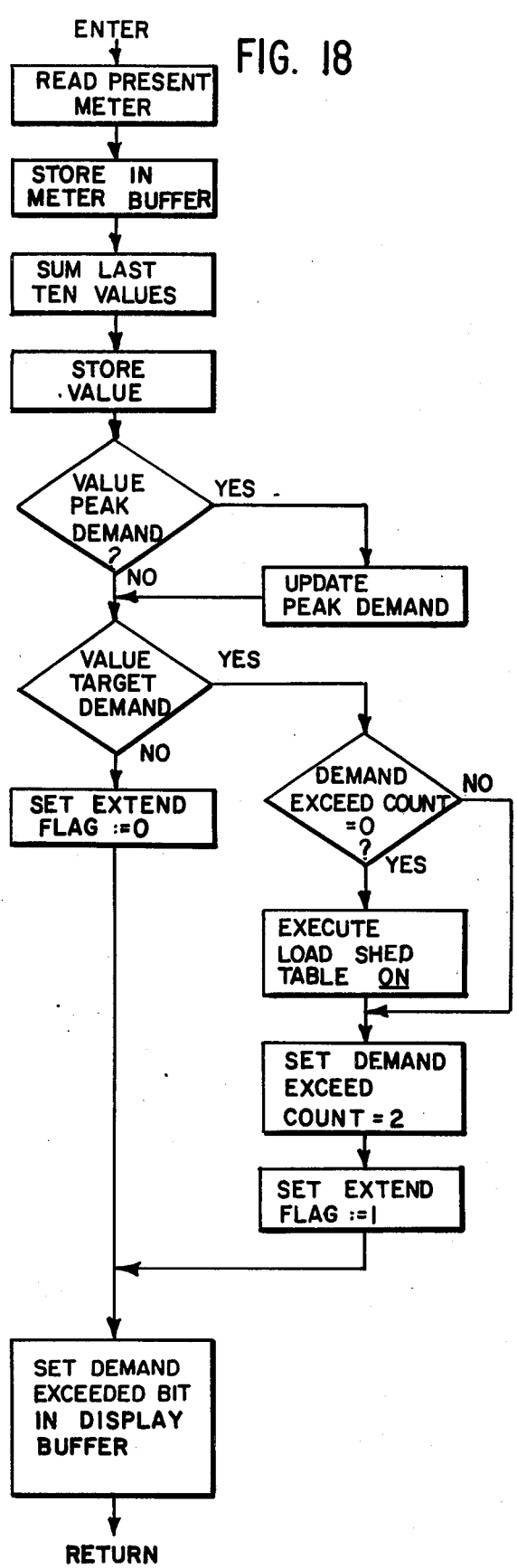

FIG. 22B
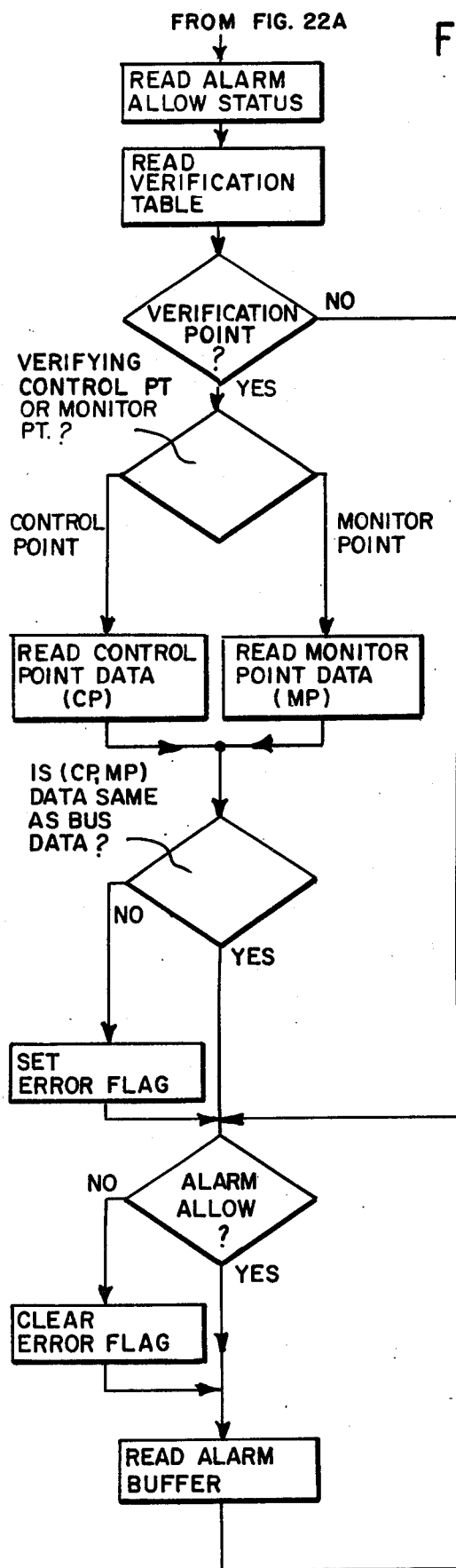
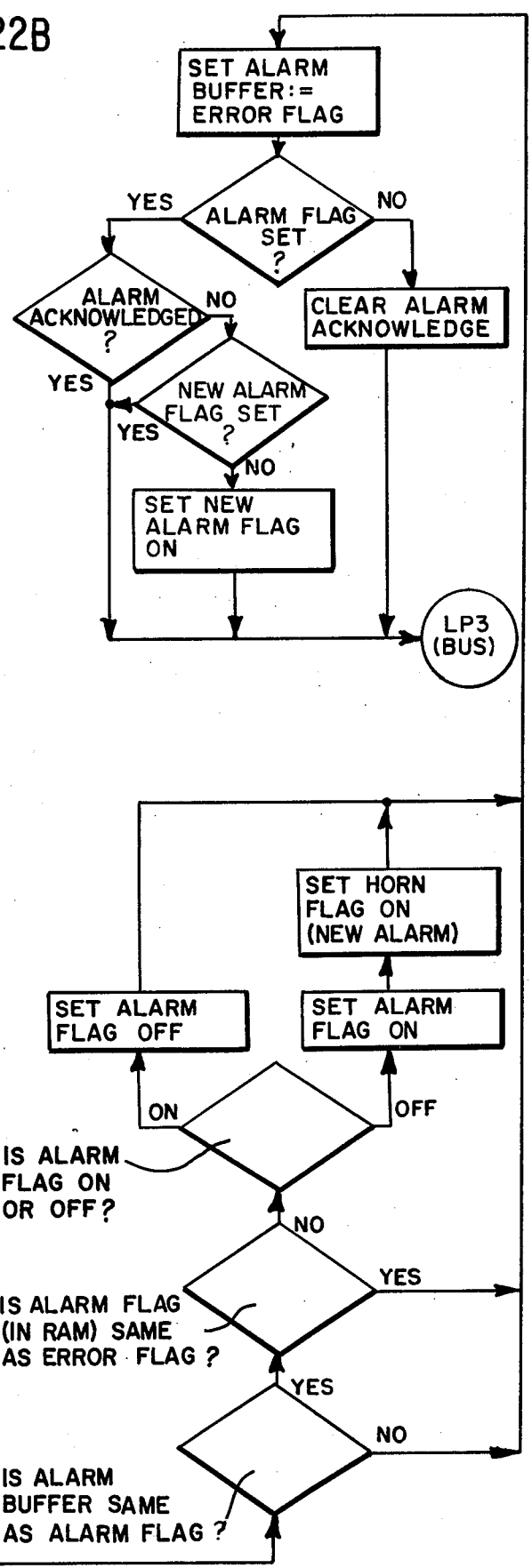

ENERGY MANAGEMENT SYSTEM

BACKGROUND OF THE INVENTION

The present invention relates to energy control and monitoring systems and more particularly to self-contained multi-function energy utilization control systems.

The demands for and necessity of managing and controlling utilization of energy has become exceedingly more important with the predictions for and the continuing existence of energy shortages, not to mention the rapidly increasing cost of energy.

Energy management systems are systems designed to provide facility control and to monitor energy usage, primarily the usage of electrical energy. Energy management systems are based on the premise that most facilities have a variety of electrical loads, some of which are controllable. Various load systems, such as, e.g., heating, ventillating, lighting and air conditioning, are considered controllable for a number of reasons.

Typically, many such facility load systems are over-designed to enable them to perform under the most adverse conditions. Under normal conditions, such systems continue to operate to design specifications, thus utilizing more energy than is required. Because of this excess design capability, energy management can reduce costs by reducing utilization of such systems thus reducing total energy consumption and peak demands.

Existing energy management systems have either had limited capabilities or have been expensive; many, for example, requiring external computer control. While complex and relatively expensive computers and peripheral equipment can be used for energy control purposes, the cost of such equipment may limit the availability of energy management and control. Small facilities also need energy management and control, but such systems must be cost effective. It is of little value to provide energy management if no savings are achieved.

SUMMARY OF THE INVENTION

In accordance with the present invention there is provided a relatively inexpensive self-contained, flexible, multi-purpose and multi-function energy control system capable of providing a wide variety of energy control and management functions without requiring expensive computer systems, time sharing services or data processing and communications networks.

The energy control system of the present invention is primarily designed for installation in and control of a single facility. Such a system provides automatic control and energy management capable of reducing peak demand and reducing total electrical consumption. In addition, the system of the present invention provides the capabilities of automatically starting and stopping a facility's energy consuming equipment in selectable and controlled sequences, and of selecting time frames for energizing selected loads, while simultaneously allowing desired manual control.

In accordance with the present invention, there is provided a self-contained energy control and management system capable of providing a variety of energy management and control functions normally provided only in conjunction with or by more extensive and complicated computer based systems. The system incorporating the present invention is capable of monitoring a large number of loads, and of indicating the operating condition thereof; is capable of controlling a large number of loads and of validating the operating condition of the controlled load.

Among the capabilities of the system of the present invention are (1) automatic start up and shut down of selected facility loads, either as a function of time or other selected conditions; (2) priority emergy control of loads in response to various selected conditions; (3) the monitoring of the usage of energy and the reduction of such usage to maintain it below selected peak levels; and (4) the cycling of selected loads on and off for selected periods to reduce the total electrical energy consumption, all while retaining simple and reliable manual control capabilities.

More specifically, the system of the present invention is capable of selectively cycling controllable loads off and on and of automatically or manually varying the control cycle of such loads. In accordance with the present invention, the system of the present invention is capable of dividing a time period, e.g., a 24 hour day, into a plurality of smaller segments of varying selected durations during each of which the cycling of the controllable loads can be altered.

In addition, cycling of loads is achieved by grouping the loads so that those loads that are normally operated in conjunction with each other may be cycled simultaneously. Load cycling may be adjusted in response to increases in power utilization and may be altered automatically in response to various preselected or external conditions.

In accordance with the present invention, the system is capable of providing information regarding the status and condition of a large number of loads, both those being controlled and those which may not be controlled. The system of the present invention is capable of verifying that any controllable load is actually in a selected operating state and provides a peak load reading for controlling the cycling of the controllable loads which is dynamic in time. All of the above automatic controllable and variable features are provided while simultaneously providing manual override capabilities and providing a simple and clear display of the condition of the system and of the facility being controlled.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWINGS

FIG. 1 is a block diagram of the major system components forming the system of the present invention;

FIG. 2 shows the system keyboard and display;

FIG. 4 is a block diagram of the data terminal interface of FIG. 1;

FIG. 10 is a block diagram of the memory of FIG. 1; and

FIGS. 11-22 are flow diagrams illustrating operation of the system of the present invention.

DESCRIPTION OF PREFERRED EMBODIMENTS

Figure 3:
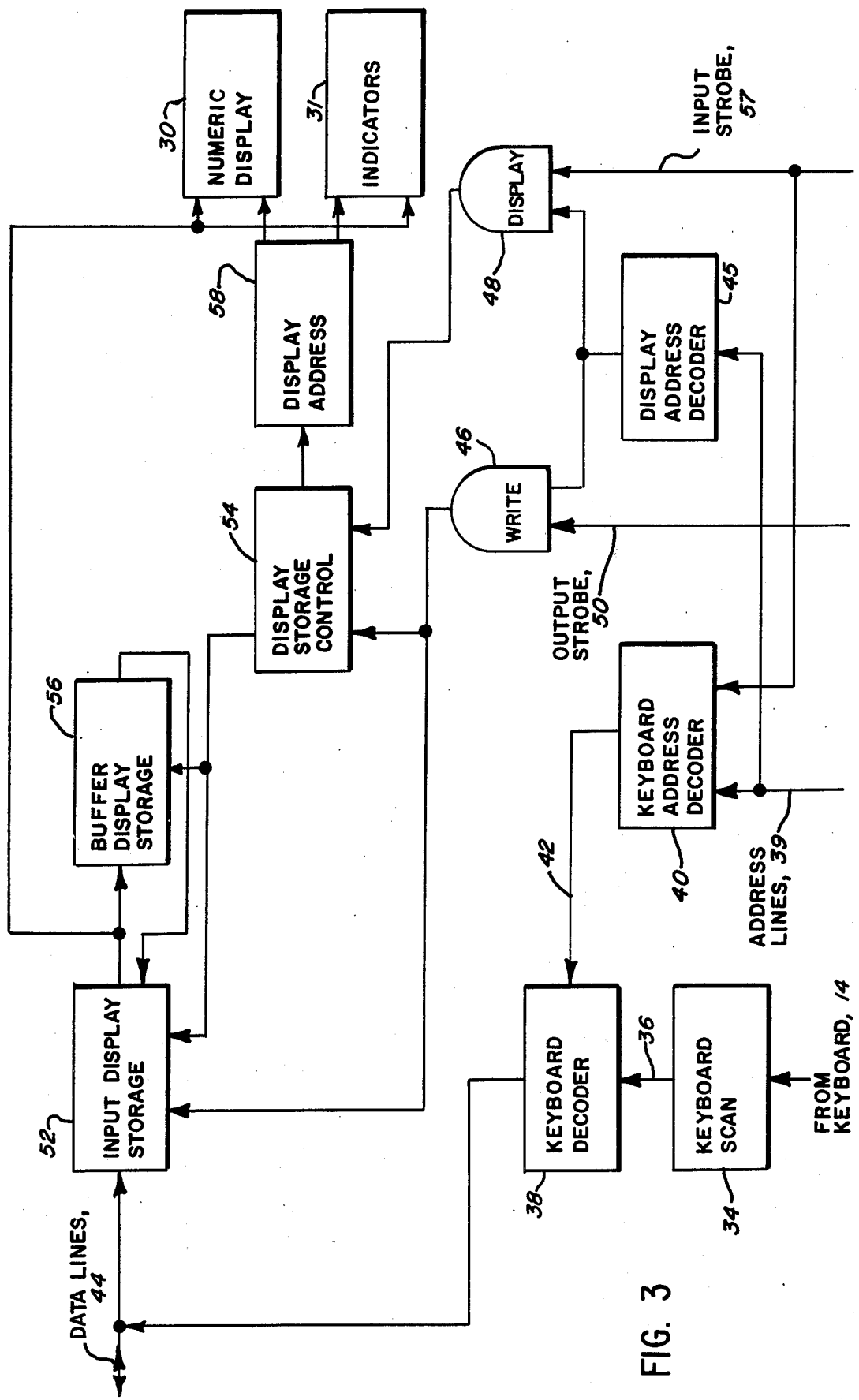
FIG. 3 is a block diagram of the data terminal shown in FIG. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The system of the present invention is designed to monitor and control a number of individual electrical loads. Those loads which may be controlled by the system of the present invention are connected to system control points. A control signal to be applied to a controlled load, either a turn on signal or a turn off signal, is applied to that control point to which the load is connected. The system is capable of controlling a discrete number of control points, in one embodiment 64 discrete addressable control points.

In addition, the system receives signals indicating the status, on or off, of a number of loads connected to monitor points. The system is capable of processing signals from a discrete number of monitor points. In one embodiment, in addition to the 64 control points, the system is capable of monitoring an additional 96 monitor points. A monitor point may be utilized by the system as: (a) a status point, indicating the operating status of a load being monitored, (b) an alarm point, a point which produces an alarm when in the on condition; or (c) a validation or verification point which produces an alarm if its status does not match the status of another designated control point or monitor point.

The system of the present invention provides a capability of identifying and displaying the existence of alarms present in the system. Thus, it is possible to identify those points which are in the alarm state, thereby allowing necessary action to be taken manually if the system does not respond automatically. For example, the system can monitor a control point and a load controlled by that control point to determine whether a load turns on or off in response to a control signal, a failure of the load to respond to the control signal being considered an alarm condition. In addition, the system can monitor two loads, one of which may control another, to provide an indication as to whether or not the controlled load has, in fact, turned on or off in response to operation of the controlling load. If the states of the two loads or monitor points do not coincide after a time delay, an alarm condition exists.

Thus, the system of the present invention provides the capability of controlling and monitoring individual loads and providing an indication of the state of the loads as well as indicating which one of the loads are in a condition which is defined as an improper or alarm condition.

In addition to the control and monitoring functions described above, the system also provides the capability of automatically turning selected individual loads on or off as a function of selected conditions. For example, the system includes a clock which uniquely identifies each day of the week and the hours in each day, is capable of turning selected control points on or off as a function of a particular time of day. Thus, a selected time at the beginning of a given day of the week may trigger a sequence in which loads connected to selected control points are turned on in order to bring a facility being controlled and monitored up for daytime operation. Loads connected to control points may also be turned off at selected times. Selected control points may also be energized or deenergized in response to other selected conditions.

The control points to be controlled and the loads connected thereto which are to be turned on or off in response to each condition are arranged in groups or tables. The system operates to activate or deactivate control points in a particular table sequentially in response to the occurance of that condition. Each table may include an override function for any control point to preclude the automatic operation of the control point until the override has been turned off.

The system of the present invention provides a plurality of such control tables for controlling the energization and deenergization of control points. Any control point can be controlled by any table it included as a part of that table. Thus, the system merely activates or deactivates one of the plurality of control tables and accordingly the control points contained within that table.

Each table referred to as a control table may be set up to be energized and/or deenergized in response to specific conditions. Thus, in the ordinary operation of a facility, one of the tables might be responsive to a particular time on the system clock for energizing those control points to be energized in the morning when a building or facility is about to be utilized for the business day. Another such table may be utilized to provide appropriate shut-down or deenergization of control points at the end of the day. Additional tables may be utilized for altering the pattern of control points energized or deenergized in response to other specific times or in response to the occurence of specific conditions. For example, one such table might be utilized to deenergize selected loads if energy demand exceeds a preselected or target value to turn off or shed selected loads and thereby reduce energy usage. Finally, one table can be used as an emergency table having priority over all others in the event that selected emergency conditions occur.

One of the variables that should be controlled by an energy control system is the peak demand since electrical energy charges are not only based on the total energy consumption but on peaks of that consumption within a given time frame, e.g., fifteen minute to thirty minute intervals. The system of the present invention is designed to preclude excess peak demands, those exceeding a selected target level, in order to avoid the additional costs resulting from peak demand charges.

The control of peak demand usage is provided in conjunction with the cycling capabilities of the system which provides for utilization of loads below the excess design capabilities. Thus, the system cycles groups of controllable loads, known as resources, in accordance with selected predetermined patterns or strategies. These patterns may vary as a function of time of day and as a function of the day of the week in order to match the facility needs.

Each day of the week may be divided into any number of segments, from as short as six minutes to as long as twenty-four hours. The number of segments for each of seven days is limited only by the capacity of the system. For each segment of the day, a selected cycling pattern or strategy may be utilized.

For each cycling strategy, a cycling time is selected for each resource. Thus, one strategy may cycle control points forming a part of a given resource by turning them off for a given percentage of a selected interval. In one embodiment, thirty resources can be utilized and each of the 64 control points can be assigned to one of those resources. Each resource may thus be cycled by being turned off anywhere from 0 to 100% of the interval, each resource being cycled sequentially through the selected interval.

Thus, where thirty resources are provided and the interval is thirty minutes, cycling of one resource commences each minute with each resource being capable of being turned off anywhere from four to thirty minutes if it is to be cycled. The cycling pattern or off time for a given resource may be different for each cycling strategy.

Throughout the day, therefore, the resources are cycled in accordance with the strategy assigned to any given segment of the day. Thus, for example, a resource may be composed of control points for loads which relate to a particular condition. This resource may be cycled differently throughout the day to maintain the desired condition as external factors vary, e.g., as utilization of the facility may vary throughout the day. This cycling of resources takes advantage of the excess capacity normally designed into loads being controlled so that the overall energy utilization is reduced while maintaining desired environmental conditions within the facility, since controlled loads are capable of producing those conditions while operating at less than design capacity.

In the event that demand rises above a selected target level, which typically is selected below the level at which excess demand charges from the power company occur, the system of the present invention automatically extends the off time for a given resource. According to one aspect of the present invention, each resource cycling pattern is extended by a selected percentage of the off time for that resource under the strategy then being utilized. In this way, the actual additional off time for a given resource is a function of the cycling pattern of the resource at the time the extension is required. Only one extension control is necessary, therefore, since the amount off time is extended is automatically converted as a function of the current off time cycling pattern for the resource.

When conditions exist which indicate that off time extension is to be required, all resources being cycled automatically are extended when the time comes for them to be turned off and the off time of any resources then off are automatically extended. When a target level is exceeded, the system automatically reduces energy consumption by extending the time during which the various cycled resources are turned off until the demand recedes below the target level. At that time, the extension function is turned off and the resource cycling time returns to the selected pattern when the resource is turned on.

FIG. 1 is a block diagram of the system incorporating the present invention. The control system of the present invention includes a microprocessor 10 which in conjunction with additional memory 12 controls the processing of data and functions in the system of the present invention. The microprocessor 10 is responsive not only to stored data and instructions in the memory 12, but is also responsive to data manually entered into the system through a keyboard 14 connected to a data terminal 16 connected to the microprocessor 10 through a data terminal interface 18. The microprocessor 10 is also responsive to data accumulated in a data accumulator 20 which is connected to power company electric meters for indicating energy usage, i.e., demand. The microprocessor 10 provides control signals to control points through the output control 22 and receives data from monitoring points through the input control 24, both of which are coupled to the microprocessor 10 through the bus adaptor 26.

The keyboard shown in FIG. 2 includes numerical keys 28 and a plurality of function keys 29 as well as display 15, a numeric display 30 and indicator lights 31. The numerical keys 28 are utilized for manually inputing numerical data into the system.

The on and off function keys 29a, 29b, are used to turn individual control points on or off, to turn the building system control tables on or off, to turn the alarm allow function on or off, and to turn the computer control override on or off to prevent cycling of a control point. The clear function key 29c clears the data display, previous entrys, errors and the scan alarm. For the scan alarm, the clear key is used to turn off an audible horn and to acknowledge an alarm.

The execute key 29d is utilized to execute functions and/or to input data into the system. The remaining function keys used individually or in combination provide for manual data insertion, manual operation of the system, and display of requested information.

Each of the function keys may include an optical indicator 31 which is illuminated when the key has been actuated. In addition, a number of other function indicator lights are provided including a battery power indicator to show when the system is operating off of the battery in response to a power failure, an ac power light when the ac power is on, a peak demand light when request for display of peak demand has been requested by actuation of the max demand function key twice, a demand exceeded light which indicates that actual demands being accumulated in the data accumulator 20 from the utility company meter is greater than the target command, a target demand indicator to indicate that the target demand is being displayed in response to actuation of the max demand function key once, a horn light to indicate that the existence of an unacknowledge alarm, on and off lights to indicate the status of various system points such as control points, monitor points, override points or alarm points in response to a request for that display as well as the on time and the off time for the building systems, an error light to indicate an error in entries which requires actuation of the clear key and an alarm light which blinks when an unacknowledged alarm exists.

The data terminal 16 not only provides an interface between manually actuated keys 28 on keyboard 14 but also controls system display of the system. The data terminal 16 provides three primary functions to provide an output compatable to the microprocessor indicative of any key that has been actuated, to receive data from the microprocessor 10 which is to be displayed and in response to a signal from the microprocessor to effectuate display of the data received.

The various functions of the system are initiated by the microprocessor 10 producing an address signal which is decoded by an appropriate address decoder, input and output strobe pulses to either trigger data into the microprocessor or to data out of the microprocessor, respectively, and data signals if data is being read out of the microprocessor.

In the data terminal 16, the keyboard 14 is continuously scanned by the keyboard scan circuit 34. When a key 28 or 29 is depressed, the keyboard scan circuit 34 produces an output 36 indicative of that key. This output 36 is decoded by the keyboard decoding circuit 38. When the microprocessor 10 produces an address signal 39 to address the keyboard 14, and an input strobe pulse to read data into the microprocessor, those two signals are decoded in a keyboard address decoder 40 which produces a signal 42 applied to the keyboard decoder 38, which produces coded output data compatable to the microprocessor which identifies the key that has been actuated. The output is applied to the microprocessor 10 over data lines 44.

Data is displayed by the data terminal 16 in a two step process. Initially, data to be displayed is written into the data terminal. This occurs when the microprocessor produces a display address signal on address lines 19 and the output strobe signal. When the display address signal occurs, a display address decoder 45 applies an output to each of a pair of gate circuits, a write gate circuit 46 and a display gate circuit 48.

During the write cycle, the output strobe pulse on the output strobe line 50 is applied to the input display storage circuit 52 and to the display storage control circuit 54 to enable the data terminal to receive data from the microprocessor 10. This occurs in a series of steps. Each time the microprocessor produces the display address signal and the output strobe signal, four bits of display data are applied in parallel to the input display storage circuit 52. When this data is received by the input display storage circuit 52, it is sequentially shifted into the buffer display storage circuit 56 so additional data can be received by the input display storage circuit 52 the next time the display and output strobe signals occur.

When all the display data is received, which in the disclosed embodiment provides sufficient information for the numerical display 30 and for the indicator lights 31, the microprocessor produces an input strobe signal on line 57 which functions as a display strobe signal the next time the display address signal is produced. The display gate circuit 48 passes a signal to the display storage control circuit 54 which begins to shift the display data in the display input and buffer storage circuits 52, 56 and concurrently therewith triggers the display address circuit 58 to sequentially energize the display 30 and the indicator lights 31 in accordance with the data stored in the display storage circuits 52, 56. This write and display continues until such time as a clear signal occurs which in effect writes all zeros into the data storage circuits 52, 56, or until such time as new data is written into the data storage circuits 52, 56 for display.

The data terminal interface 18 primarily provides an interface between the microprocessor 10 and the data terminal 16. The data terminal interface 18 also includes a four second clock 59 for use by the microprocessor, a crystal battery driven crystal oscillator 60 used as timing circuit in the event of loss of ac power, a mode selection switch 62 for selecting system operating modes, e.g., a normal mode, a hold mode, a limited start up mode and a fast time or test mode. A manual control switch circuit 64 may also be provided for disabling manual operation of the data terminal 16 and the keyboard 14, or portions thereof.

Energy control and management utilizing the system of the present invention involves the monitoring the status of a number of loads connected to monitor points and producing control pulses to operate a number of loads connected to control points. In order to operate control points and determine the status of monitoring points, the system is provided with a plurality of data input circuits 24, each capable of providing information with respect to a number of monitoring points and a plurality of output control circuits 22 each capable of applying control signals to a number of control points. In the one embodiment the system is capable of monitoring up to 96 monitor points by utilizing up to six data input controls, each monitoring 16 monitor points; and is capable of controlling up to sixty-four control points by utilizing up to eight output control circuits, each controlling eight control points. For illustrative purposes, only one input and output control circuit is shown in the drawing and will be described herein since each is identical.

The data input control circuit 24 produces a data signal for each monitor point. This monitor data signal indicates whether the monitor point is on or off and is applied to the microprocessor 10 through the buss adaptor 26 under control of the mixroprocessor 10. Control signals produced by the microprocessor 10 are applied to the output control circuit 22 through the buss adaptor 26 under control of the microprocessor 10.

Figure 5:
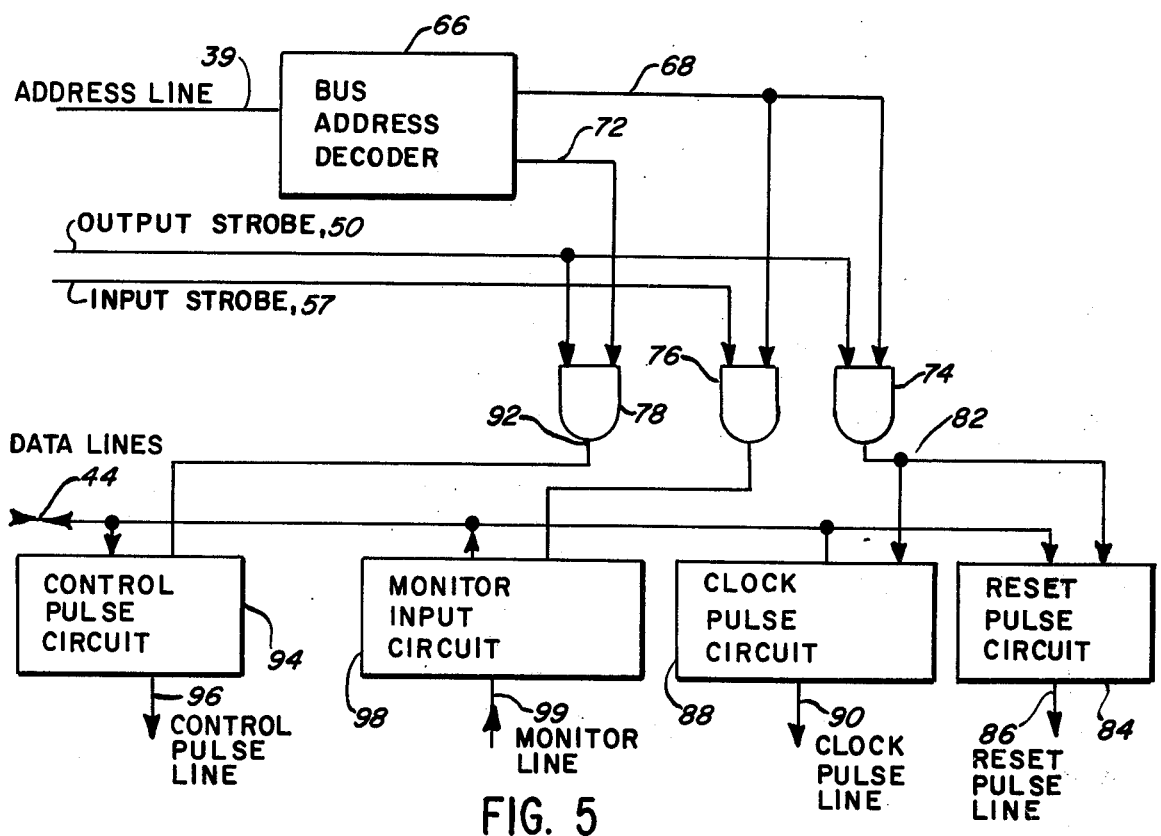
FIG. 5 is a block diagram of the buss adaptor of FIG. 1.
Figure 7:
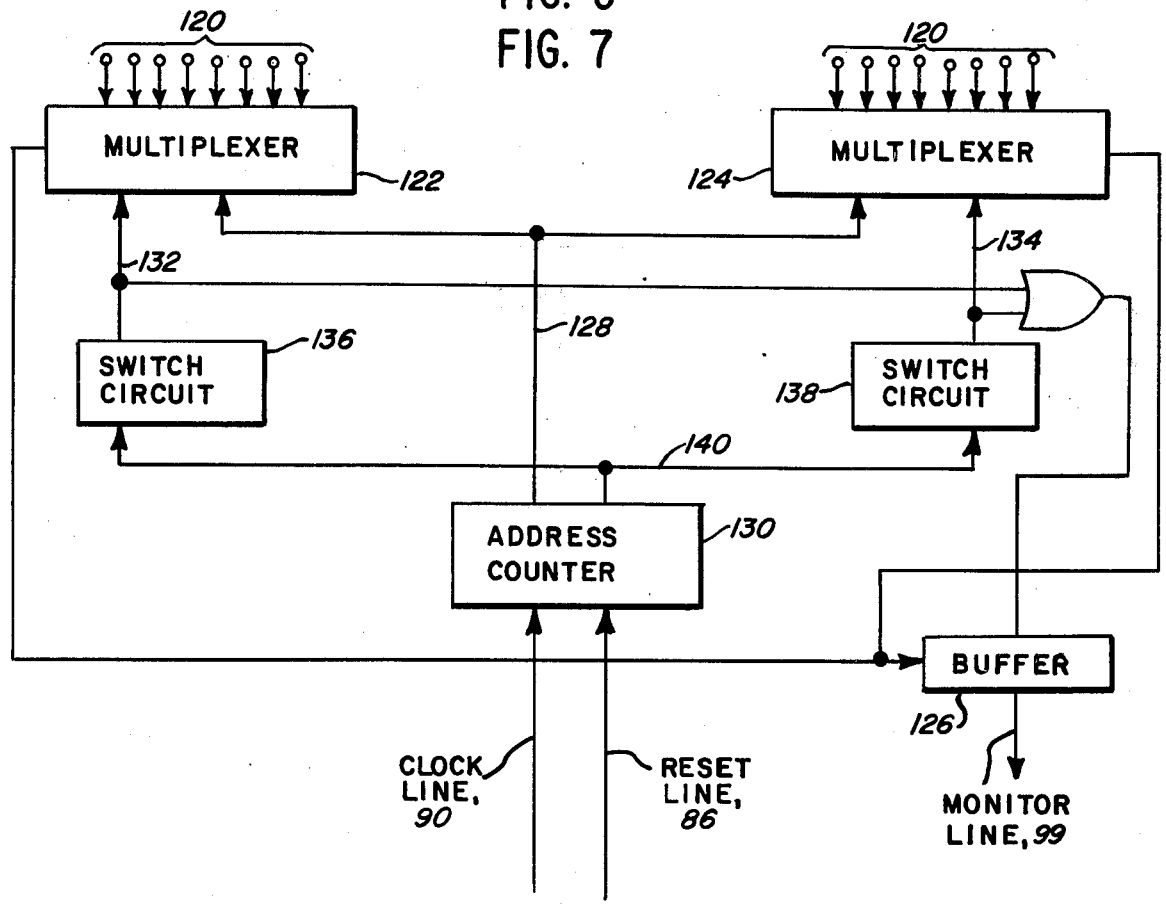
FIG. 7 is a block diagram of an input control of FIG. 1.
Figure 6:
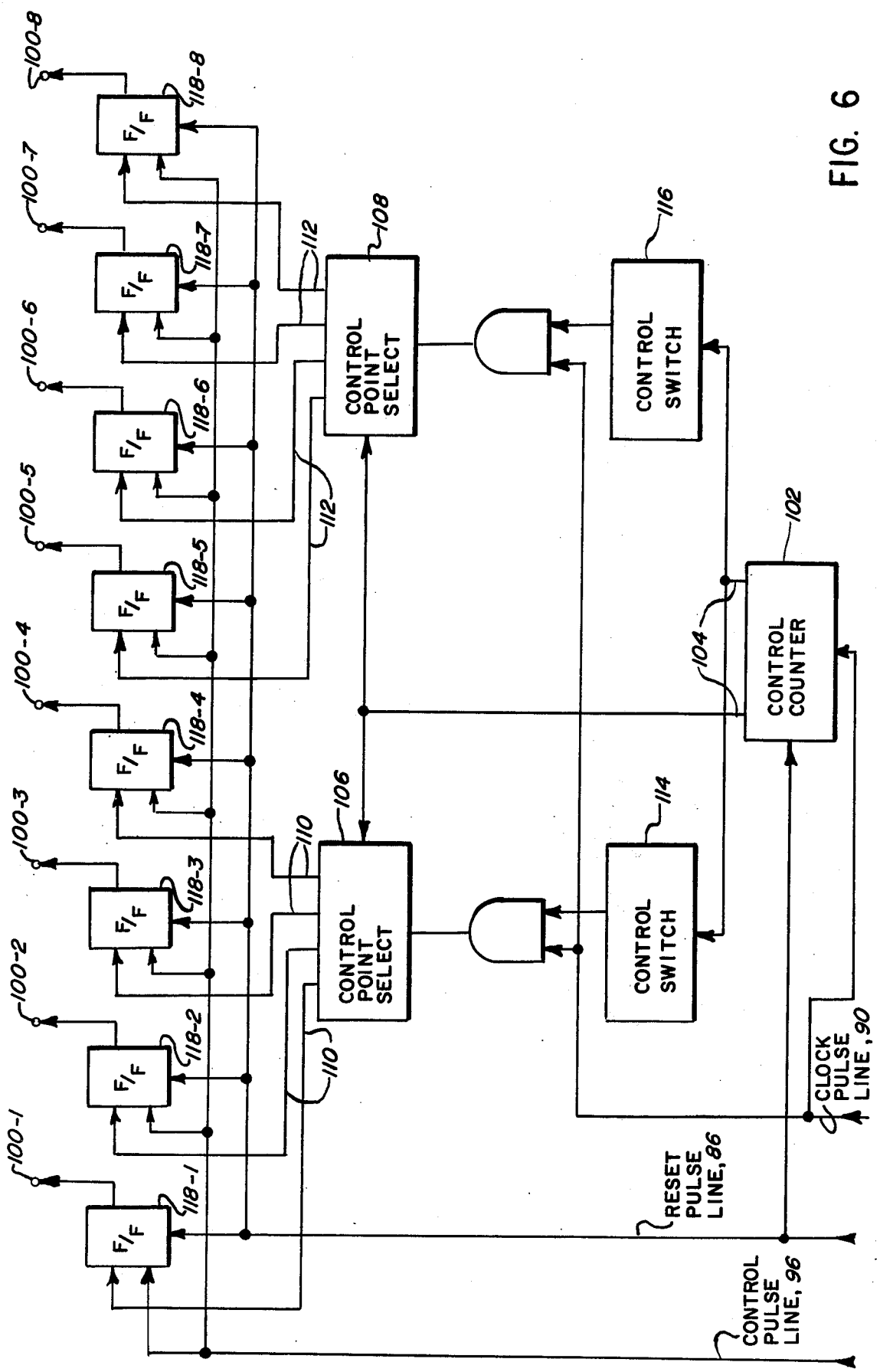
FIG. 6 is a block diagram of an output control of FIG. 1.
Figure 8:
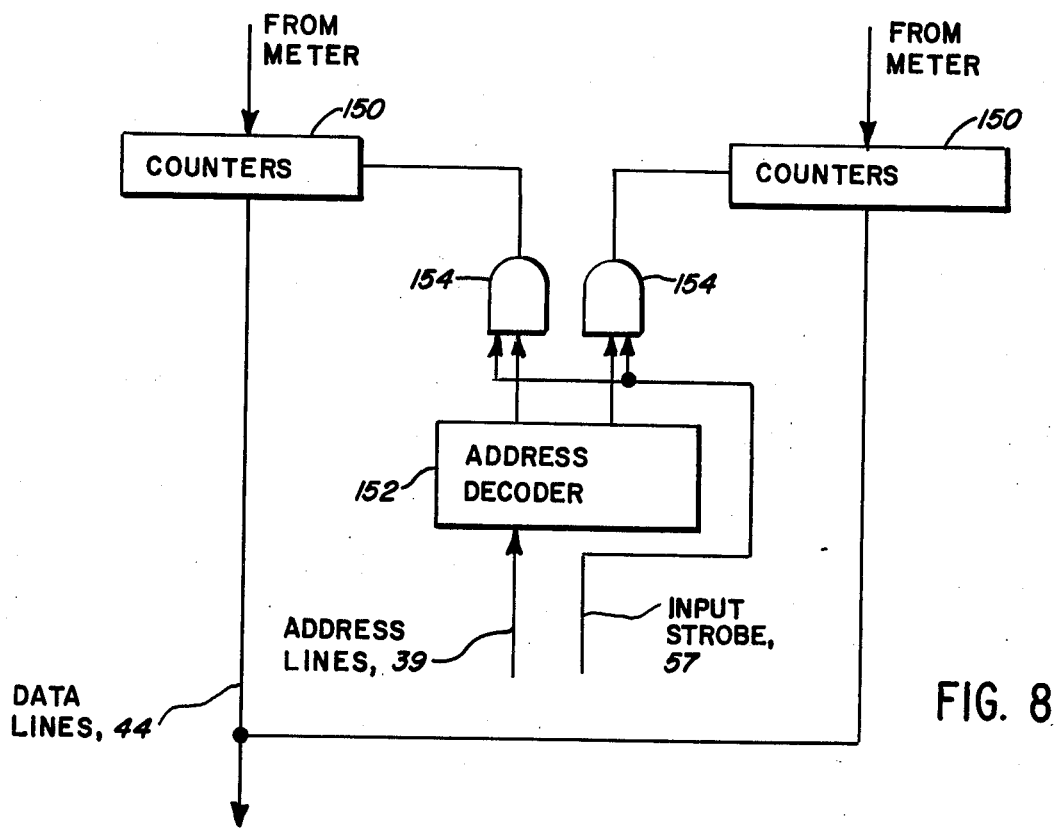
FIG. 8 is a block diagram of the data accumulator of FIG. 1.
Figure 9:
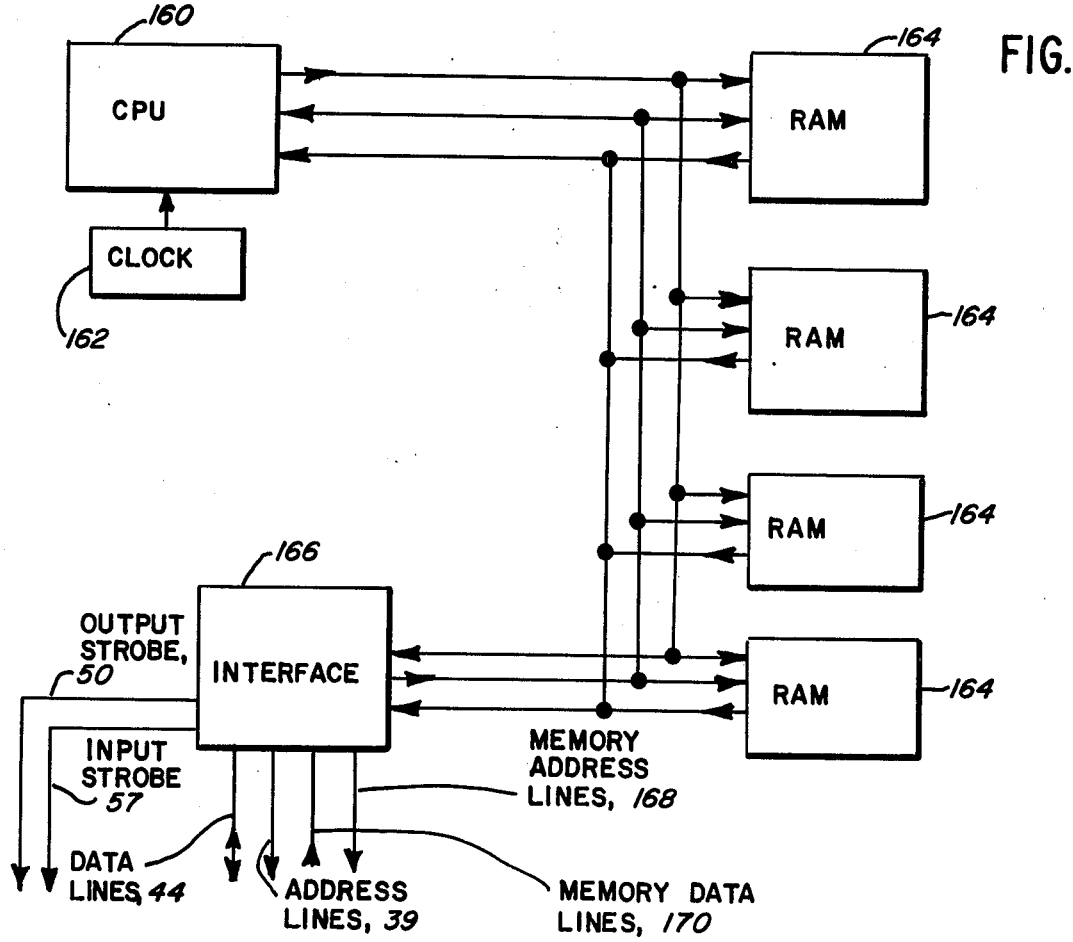
FIG. 9 is a block diagram of the microprocessor of FIG. 1.

Turning to FIG. 5, there is shown a block diagram of one embodiment of the buss adaptor 26. Control points and monitor points are addressed by the microprocessor 10 initially by addressing the buss adaptor 26 which is responsive to two different address signals. When one of the two address signals is applied to the buss adaptor 26, and address decoder 66 produces an output 68, and when the second address signal is produced, decoder 66 produces an output 72. The output 68 of the address decoder 66 is applied to a pair of gates, circuits 74, 76, and the output 72 of the address decoder 68 is applied to a gate circuit 78. The other inputs to gate circuits 74, 78 are the strobe output pulse on line 50 and the other input to gate circuit 76, is the strobe input pulse on line 57.

When the first address signal is received and decoded by the buss address decoder 66 and when an output strobe pulse is applied to line 50, gate circuit 74 passes an output 82 which is applied to reset pulse circuit 84 together with data on data lines 44 from the microprocessor 10. As a result, reset pulse circuit 84 produces a reset pulse on line 86 which is applied to the data input and output control circuits 22, 24. The output 82 of gate circuit 74 is also applied to clock pulse circuit 88. Additional data on data lines 44 causes clock pulse circuit to produce clock pulses on line 90 which is also applied to the output and input control circuits 22 and 24. In the embodiment capable of monitoring 96 monitor points, 96 clock pulses are produced between reset pulses.

In operation, when the address decoder 66 is addressed simultaneously with the out strobe on line 50, the data on data lines 44 produce a reset pulse on line 86 immediately followed and overlapped by the first half or negative portion of a clock pulse on line 90. During this portion of the clock pulse cycle, the address signal is incremented so the address decoder 66 produces an output on line 72. This output, applied to gate circuit 78 together with the output strobe pulse on line 50 produces an output 92 of gate circuit 76 which is applied to control pulse circuit 94. The data on data lines 44 is also applied to control pulse circuit 94 to produce a control pulse on line 96 indicative of the desired state of a control point. The address signal reverts to the first address so the address decoder produces an output 68, which together with the out strobe 50 and the data on data lines 44 causes the clock pulse to go positive. While still at this address, the output strobe 50 terminates and the input strobe 59 is produced. Both of these signals are applied through gate circuit 76 to monitor input circuit 98 to enable that circuit to read data from a monitor point over line 99 which is applied to the microprocessor 10 through the data lines 44. When the first address is once again addressed, the output strobe 50 is produced to apply a signal 82 to the clock circuit 88, causing the clock pulse to go low, i.e., the start of a second clock pulse. The cycle is now repeated until a total of 96 clock pulses have occurred or until the next reset pulse resets the system. Thus, the buss adaptor 26 produces when first addressed a reset pulse. Thereafter 96 clock pulses are produced. During the first half of each clock pulse a control signal is applied to the output control circuit, and during the second half of each clock pulse a monitoring point is sensed.

Turning to the output control circuit 22, the individual control points 100-1 through 100-8 are addressed by the output control circuit 22 sequentially in response to the clock pulses on line 90. Initially, the reset pulse on line 86 resets the control circuit 22. Each clock pulse 90 is applied to a control counter 102 which produces coded outputs 104 representative of the number of clock pulses received. If there are only 64 control points, counter 102 is only responsive to the first 64 clock pulses. The lowest order outputs 104 are applied to a pair of control point selection circuits 106, 108 each of which produce an output on one of four output lines 110, 112, respectively.

Each of the selection circuits 106, 108 is enabled by the combined output of the clock pulse 90 and the outputs of one of a pair of control selection switch circuits 114, 116. The inputs to selection switch circuits 114, 116 are the remaining outputs of the control counter 102. For each clock pulse received, one of the two selection switches 114, 116 produces an output indicating that the control point to be addressed is one of the four points 100-1 to 100-4 connected to the output lines 110 of the first control point selection circuit 106 or one of four control points 100-5 to 100-8 connected to the output lines 112 of the second control point selection circuit 108. Correspondingly, if no control points controlled on a particular output control circuit are to be addressed, neither of the control switches 114, 116 will produce an output, e.g., a control switch on one of the other output control circuits may be addressed by the particular clock pulse count.

Each of the outputs 110, 112 of each of the control point selector circuits 106, 108 is applied to the toggle input of a different one of a plurality of control point flip flops 118. The output of each flip flop 118 is connected to a separate control point. The data inputs to all of the flip flops 118 are connected to the control pulse line 94 so that when a control pulse is received it is applied to all of the data inputs. However, only that one of the flip flops 118 which also receives a toggle input produces a control pulse applied to the corresponding control point 100.

The input control circuit 24 is somewhat similarly constructed. The input control circuit 24 continuously receives data from each of sixteen monitor points 120. Eight monitor points 120 are connected to a first multiplex circuit 122 and eight points are connected to multiplex circuit 124. Each multiplex circuit 122, 124 passes an output from one of the monitor points 120 to a buffer circuit 126 when that particular monitor point is addressed and when the multiplex circuit is enabled. Addressing signals 128, which reflect one of eight possible addresses, are applied to multiplex circuit 122, 124 by an address counter 130.

The address signals 128 are applied to both multiplex circuits 122, 124 only one of which receives an enable signal 132, 134, respectively, the outputs of a pair of switching circuits 136, 138, respectively. The inputs to the switching circuits 136, 138 are the remaining outputs 140 of the adresss counter 130. Each switching circuit 136, 138 produces an output only when the outputs 140 of counter 130 indicate that the proper number of clock pulses 90 have been applied to the address counter 130. Thus, each switching circuit 136, 138 will produce an output for eight normally consecutive clock pulses, although quite clearly it is not necessary that each multiplex circuit be addressed consecutively.

The outputs 132, 134 of both switching circuit 136, 138, are also applied to the output buffer circuit 126 which receives the output from each of the multiplexers 122, 124 to enable that circuit. The output of the buffer circuit 126 is applied to the monitor line 99 and is passed to the microprocessor when the buss adapter receives the appropriate address and strobe pulses, as described above, to read monitoring point data. Since only one monitoring point of the possible 96 is read at a time because of the address control within the input control circuits, and since each clock pulse results in unique identification of only one of the possible monitoring points, the microprocessor is able to determine which of the monitoring points data is being received from.

As indicated above, one function of the system is to monitor the total power being used within a given time frame. As is well known, the meters provided by the electric companies produce pulses, the rate of which is a function of energy usage. Each of these pulses from a meter is applied to the data accumulating circuit 20 which includes one or more counters 150. The microprocessor produces an address signal for a particular accumulator counter which is decoded by the accumulator address decoder 152. Each output of the decoder 152 is applied through a gate circuit 154 to read out the value stored in each counter when an input strobe pulse 57 is received. The output of the data accumulator 20 is applied directly to the microprocessor 10 where it is added to corresponding outputs for previous periods so that the processor can provide an output indicative of an accumulated load for a given period of time. According to one aspect of the present invention, the data is summed for a period of time which floats. In other words, the oldest data is subtracted from the total each time the most recent data is added; thus the total value retained within the microprocessor is for the most recent period or accumulation interval.

Operation of the overall system is controlled by the microprocessor 10 and the memory 12 working in conjunction with each other. In one embodiment of the present invention, the microprocessor and memory are constructed as part of a MCS-40 system marketed by Intel Corporation.

The microprocessor 10 includes a CPU 160, e.g., a 4040 central processor which incorporates with a system clock circuit 162, a plurality of 4002 RAM's 164 and a 4289 interface circuit 166, all of which are disclosed, for example, in the Intel MCS-40 user's manual, third edition, dated March, 1976.

The outputs of the 4289 interface 166 include the address lines used to address not only the memory 12 but also the various circuit elements described above. In addition, the 4289 provides exclusive memory address signals 168 and input lines 170 for data read from the memory 12. For interfacing with the remaining components of the system, the 4289 includes the data lines 44 for reading data out of and into microprocessor 10 and the output and input strobe lines 50, 57, respectively.

The memory 12 includes a plurality of 2708 PROM's 175 which are addressed by the output of the microprocessor 10. The address signals are applied to a memory decoder which selects one of the four memorys 175. The remaining address signals 168 select an address within each memory. The data and instructions read from the PROM's 175 are applied to the microprocessor interface over the PROM data lines 170.

Figure 11:
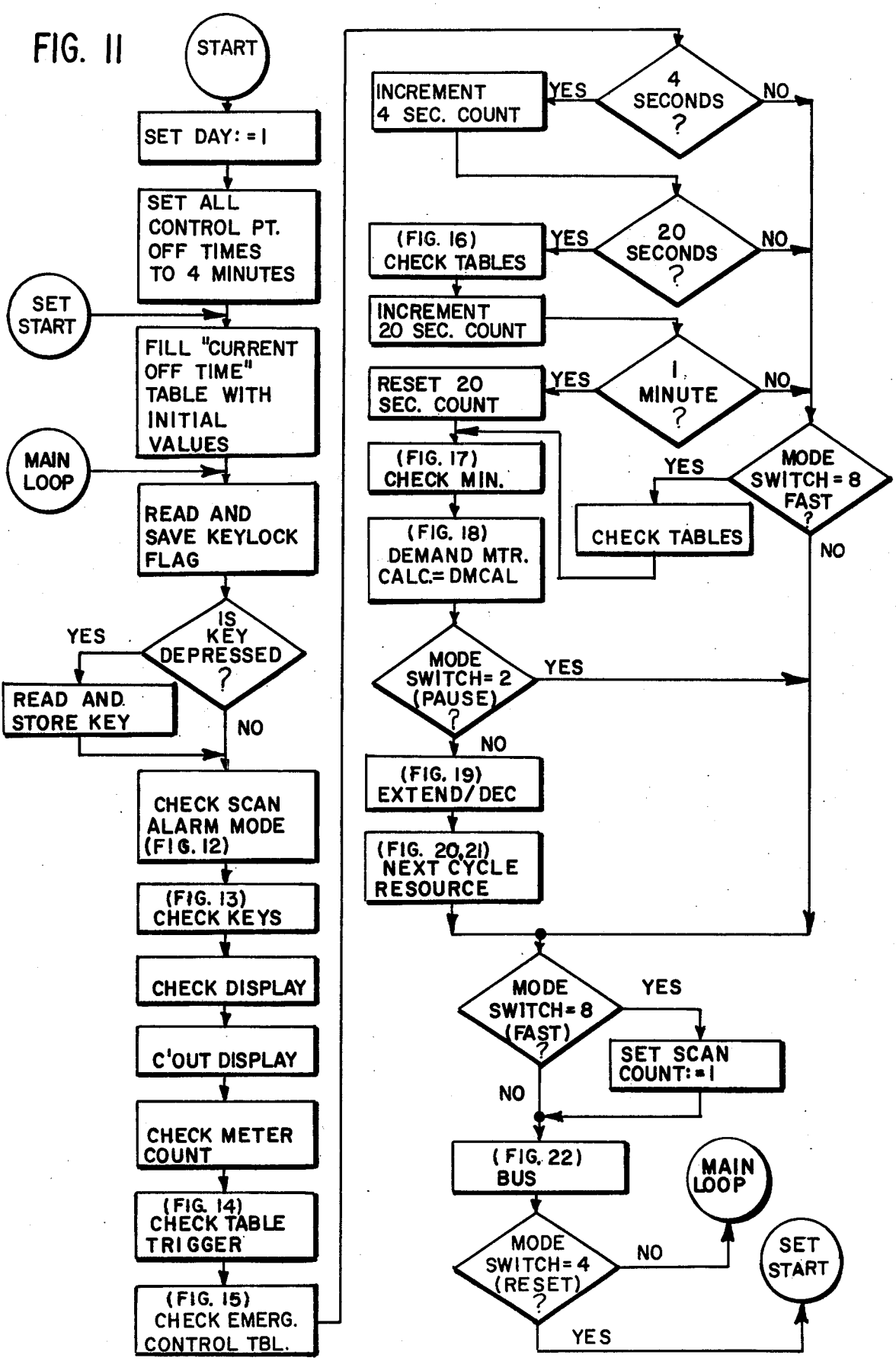

FIG. 11 is a flow chart showing the main operating cycle for one embodiment of the system incorporating the present invention. In this embodiment, the system is capable of controlling 64 control points and loads connected thereto, sensing the status of 96 monitor points and the loads connected thereto, cycling 30 resources and the control points forming a part of each resource, dividing each of the seven days of the week into any number of segments, and employing any one of six cycling strategies for the 30 resources during any of the day segments.

When the system is first energized, two preliminary operations are effectuated to initialize system conditions. The seven day clock is reset to the beginning of day one. Next the resource off times stored in the current off time buffer memory are all set to four minutes. The current off time buffer memory stores the off time of each resource for the selected strategy to be utilized. The next step, therefore, is to store in the current off time buffer memory the off times corresponding to a selected cycling strategy for the particular time of day. In order to do this, there is stored in memory for each day the assignment to that day of a day type. For each day type there is also stored in memory each of the cycling strategies to be employed for that day type and the time period during which each such strategy is to be employed for that day type. For example, the following is an example of the day type information that would be stored in a memory for each day:

| Day Number | | Day Type |
|---|---|---|
| 1 | (Monday) | 2 |
| 2 | (Tuesday) | 2 |
| 3 | (Wednesday) | 2 |
| 4 | (Thursday) | 1 |
| 5 | (Friday) | 1 |
| 6 | (Saturday) | 1 |
| 7 | (Sunday) | 3 |

Upon reading from memory the day type for the particular day indicated by the seven day clock, the system would also read from memory the cycling strategy to be employed for that day type at the time of day indicated by the clock. For example, for each day type the cycling strategies might be as follows:

| Day Type | Strategy | Time Period |
|---|---|---|
| 1 | 6 | 0000-0700 |
| 1 | 1 | 0700-0900 |
| 1 | 2 | 0900-1200 |
| 1 | 3 | 1200-1300 |
| 1 | 4 | 1300-1600 |
| 1 | 5 | 1600-2000 |
| 1 | 6 | 2000-2400 |
| 2 | 6 | 0000-0700 |
| 2 | 1 | 0700-0900 |
| 2 | 2 | 0900-2000 |
| 2 | 6 | 2000-2400 |
| 3 | 6 | 0000-1100 |
| 3 | 1 | 1100-2100 |
| 3 | 6 | 2100-2400 |

Upon determining the strategy to be employed for the current time period, the system reads from memory the resource off times for the particular strategy being employed and stores the off time for each resource in the current off time buffer memory.

After storing the resource current off times in the current off time buffer memory, the system addresses the data terminal interface by applying an appropriate address signal on lines 39 to read the status of the manual control switch 64. The data representing the status of manual control switch 64 is stored for later use.

The system then addresses the data terminal by applying an appropriate address signal over lines 39 to the keyboard address decoder 40 as well as an input strobe on line 57 to produce a signal on line 42 to the keyboard decoder which reads the identity of any key actuated into the system over data lines 44. This information which is the identity of the key actuated is also stored in the buffer memory for later use.

The next operational step is to check and determine whether the system has been placed in the scan alarm mode by actuation of the scan alarm key.

In the scan alarm mode, the system scans buffer memory to determine if any alarm points are in alarm condition. If an alarm condition exists, the system sequentially displays each alarm that is on, but freezes the display at each unacknowledged alarm until acknowledged. Thus, if the alarm is one that had been previously acknowledged, the system then displays the next alarm. If it is a new alarm the horn indicator and the horn are energized, and the display is frozen until the alarm is acknowledged.

Figure 12:
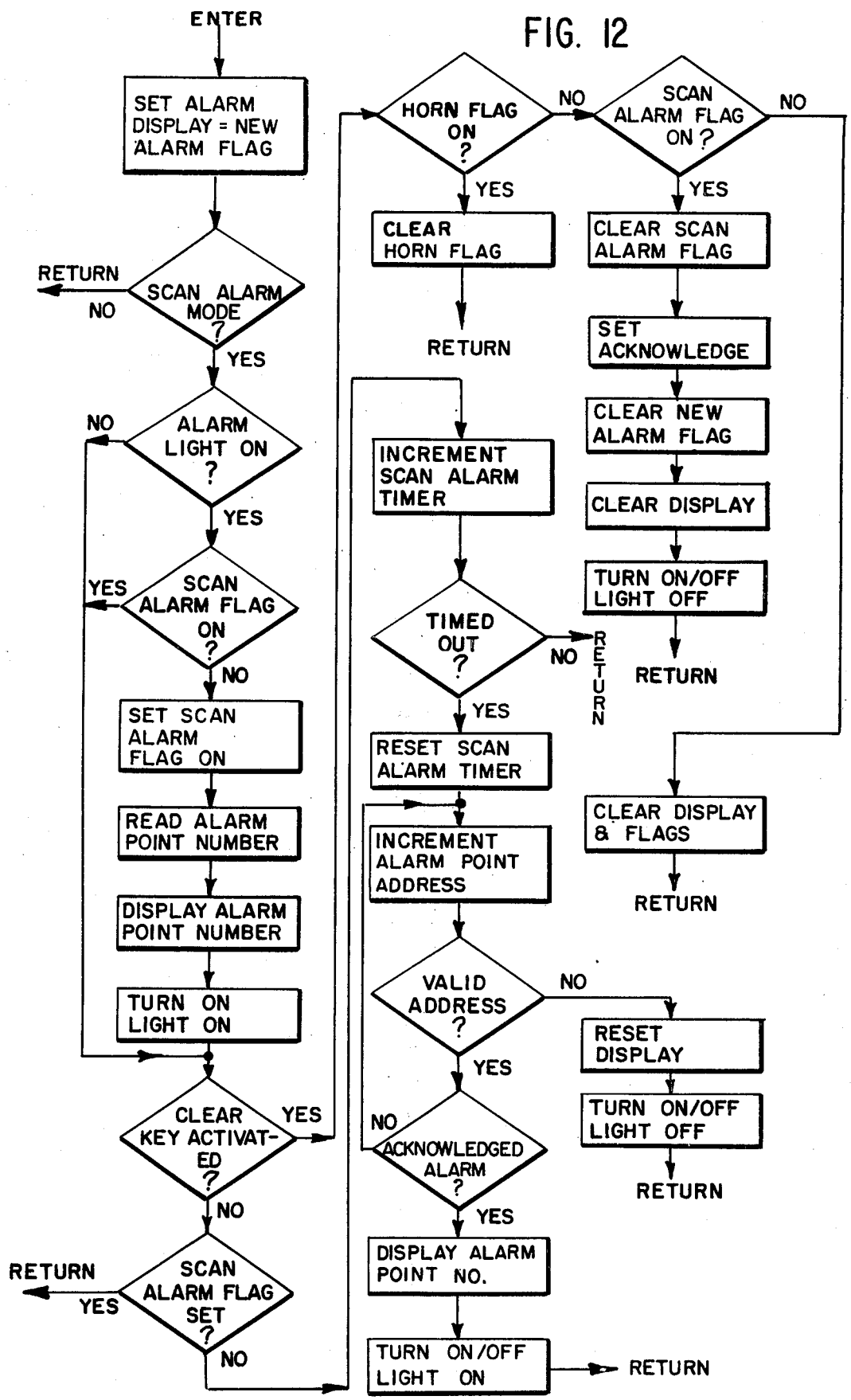

Referring to FIG. 12, there is shown the flow chart for the scan alarm cycle. Initially, the alarm display is set with a new alarm flag. If the scan alarm key has not been actuated, the system checks to see whether the alarm light is on, i.e., whether an unacknowledged alarm exists.

If the alarm light is on, the system turns on the scan alarm flag, reads the address of the alarm having the lowest number, displays that number and energizes the on light. Since this is a new alarm, one that has not been acknowledged, the horn light and the horn are energized. If the clear key has not been activated, the system returns to the main cycle since the scan alarm flag is set.

The unacknowledged alarm continues to be displayed and the horn and horn light remain on until the clear key is actuated. At that time, the horn is turned off, but the number of alarm point continues to be displayed. The next time the clear key is actuated, the scan alarm flag is turned off, the acknowledge bit for that alarm point is set, the new alarm flag for that alarm point is cleaved, the display is cleared and the "on" light is deenergized.

If an acknowledge alarm exists, the alarm light is not on. The horn flag and the scan alarm flag, therefore, have been cleaved. The scan alarm timer is incremented until it times out, after which it is reset. The system scans all of the alarm point address sequentially until it reads an acknowledge bit. The acknowledged alarm is displayed and the "on" light is energized. Thus, each acknowledged alarm is displayed sequentially.

If the clear key is actuated after all alarms are acknowledged, the scan alarm mode is cleared. The system returns to the main operating cycle to read and process any actuated keys previously stored. The system either performs the necessary operations, or stores data in appropriate location in the buffer for execution by the system at a later step in the flow chart. The keyboard is utilized by actuating certain of the function keys to indicate what is to be done by the system, actuating selected numerical keys if that is appropriate to the function selected, and actuating the display and/or execute keys, if appropriate.

Thus, for example, if it is desired to determine which control points have been energized, the control point function key, the display key and the execute key are actuated in sequence. The system displays in the numerical display the control point with the lowest control point number which is on. Subsequent actuations of the execute key provide a display of each additional control point that is on by displaying the numerical identity of those control points. Alternately, actuation of the monitor point key and alarm point key results in display of the identity of each monitor point and alarm point respectively, which are on.

The scan alarm mode is implemented by actuation of the scan alarm key. Any given alarm point can be prevented from being an alarm by actuation of the alarm allow key, the number keys to identify the alarm point, and the off key, all of which are sequentially stored in buffer memory. Thus, a given alarm point does not act as an alarm when it goes on or when it does not properly verify a corresponding monitor or control point. This function is used, for example, when a piece of equipment is to be shut down manually for maintenance and, therefore, even though a control point might be turned on to energize the equipment, the equipment itself will not respond. The system, therefore, would detect an alarm because the state of the control point and the corresponding monitor point would be different.

By operation of the keys the following can be displayed in the numeric display. The on/off status of control points can be displayed by actuation of the control point key and the display key and the execute key. Each subsequent actuation of the execute key will cause the system to display sequentially each of the control points that are on. Similarly, monitor points and alarm points that are on can also be displayed. In the scan alarm mode, actuation of the scan alarm key automatically displays those alarm points that are on, as described above.

If it is desired to determine which alarm points have been overridden by the alarm key, this also may be displayed sequentially by actuation of the alarm allow key and the display key. The day and time may be displayed by actuating the day time key and the display key to display the day of the week numbered 1 through 7, the time and the off time strategy then in effect. The on or off status of the control point override can also be displayed, as can readings of the current demand meter, the peak demand that has been achieved, the target demand, the off time of each resource and the start up and shut down time of the building for each day.

Certain operational steps may also be implemented by use of the keyboard. For example, if a control point is to be turned on or off, a building system table is to be turned on or off, alarm allow is to be turned on or off or the control override is to be turned on or off, these function keys, number keys when appropriate, along with the on or off key and the execute key are actuated to achieve those functions. When the system reads the information stored from the keyboard, it will either execute the functions identified by the actuated keys, e.g., by turning a particular control point on or off, or will store the information in an appropriate buffer storage location for automatic execution by the system later or in the main control cycle.

Figure 13A:
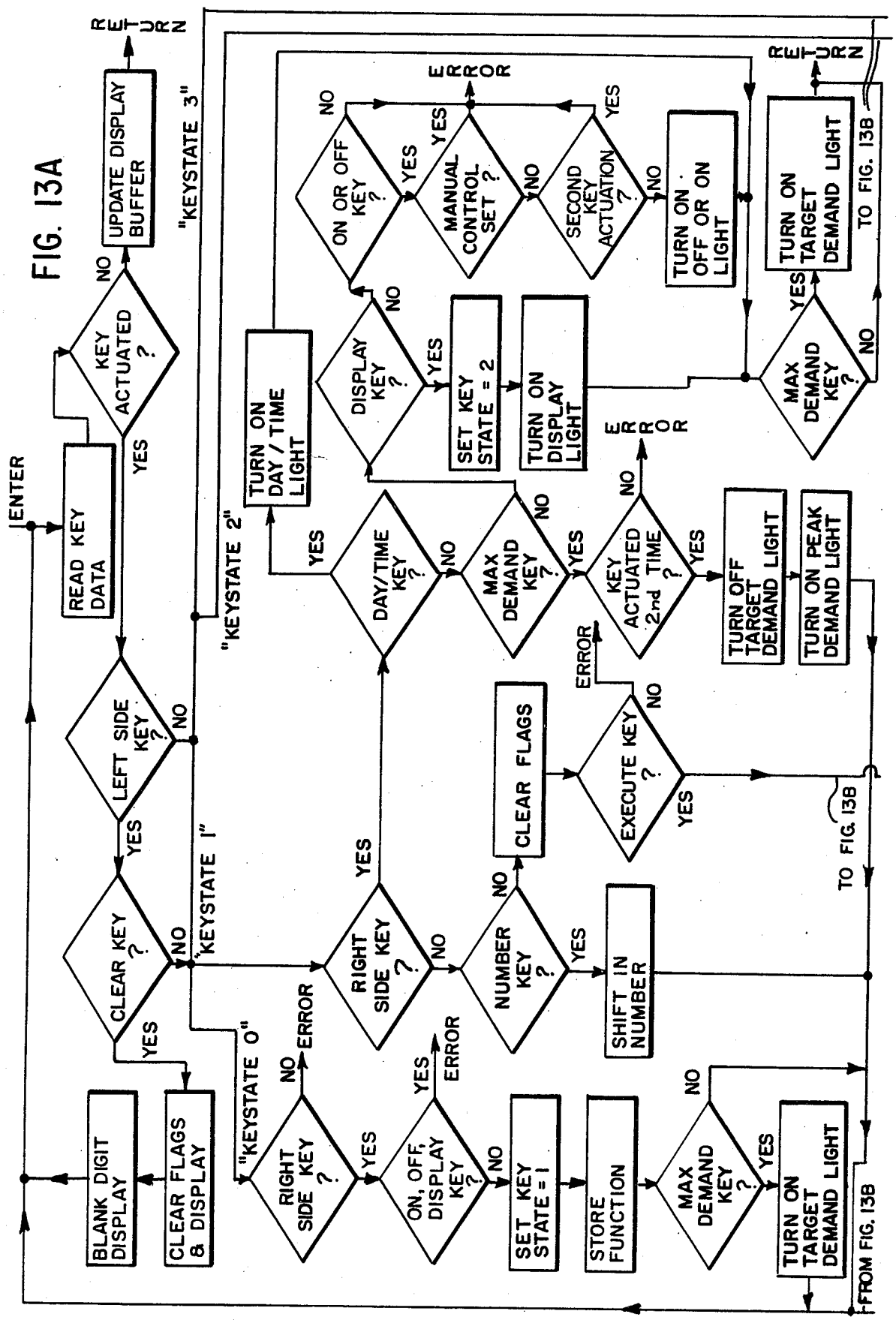
Figure 13B:
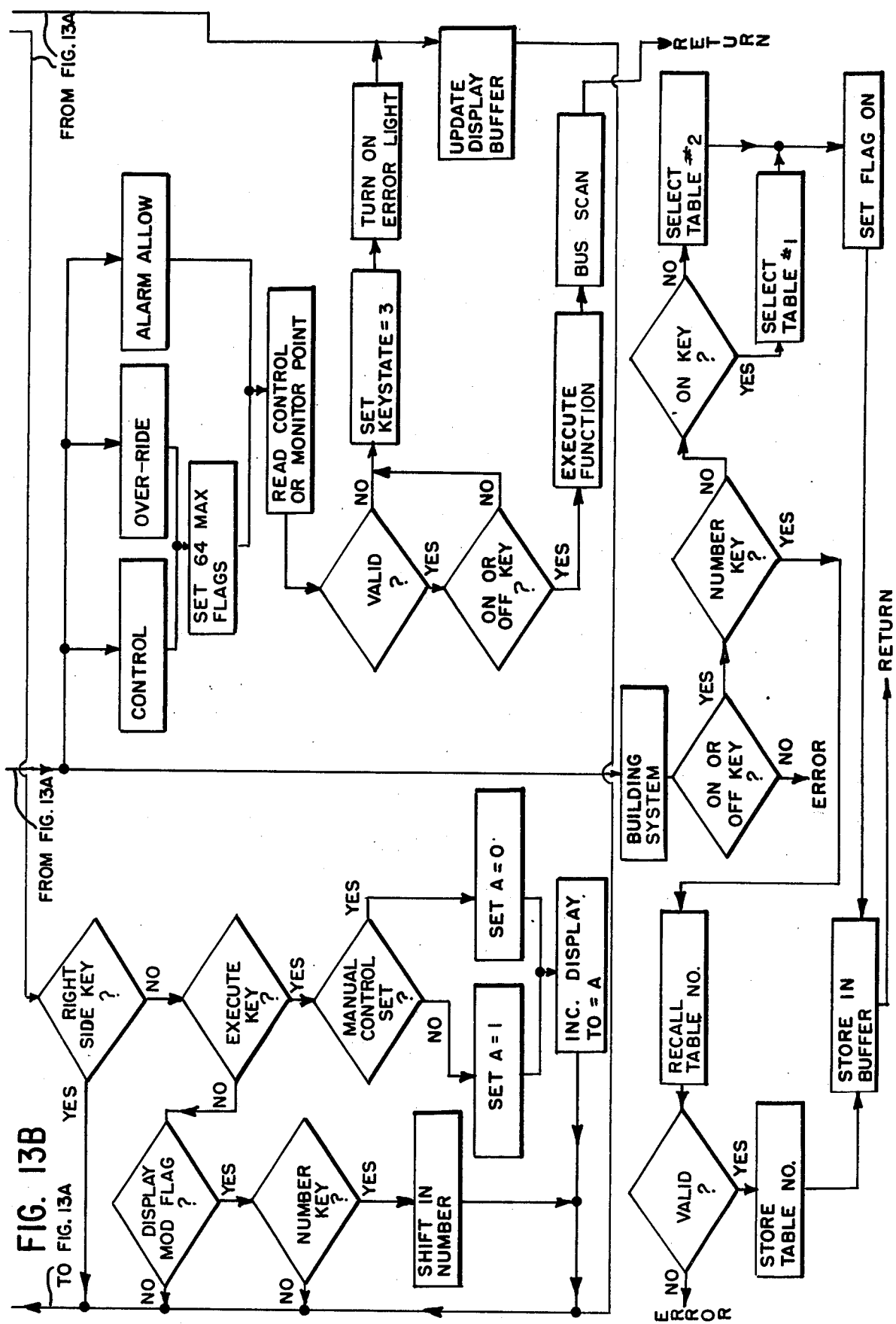

Turning to FIG. 13, there is shown a flow diagram of the keyboard cycle for processing keyboard entries to either display data and/or execute control operations. As shown, the system reads the key data stored in the buffer memory to determine whether there is a keyboard entry. If not, the system updates the display buffer and returns to the main cycle.

If a key has been actuated, the system checks to determine whether the key that has been actuated is one of the keys on the left side of the keyboard, i.e., one of the number keys, the clear key or the execute key or one of the keys on the right side of the keyboard, i.e., a function key. If one of the left side keys has been actuated, the system checks to determine immediately whether it is a clear key in which case all of the previous keyboard processing and displays are cleared.

If it is not a clear key, the system again checks to determine whether it is a left side key or a right side key since it is an error to actuate the numerical keys or the execute key before any of the functions. If a left side key has been initially depressed an error signal is produced, which inactivates the keyboard until the clear key has been actuated.

If, on the other hand, it is a right side key, the system checks to determine whether it is a display key which is also an erroneous keyboard entry if no function keys have previously been actuated. The system stores the function represented by the actuated key for later use, then checks to determine whether the key that has been actuated is a max demand key, a request for a display of target demand previously stored in the system, in which case the target demand light is turned on and the system returns to beginning of the key cycle to determine whether or not another key has been actuated. If no new key is actuated, the system compares the data stored in the display register to that stored in the display buffer, updates the display register if a change has occurred and returns to the main operating cycle.

The next time a key is read, the system checks if it is a clear key and if not determines whether it is a function key or one of the left side keys. If it is a number key, the number is read and stored in the numerical registers.

If the key that has been actuated is a right side or a function key, the system first checks to determine whether it is the day time key and if so turns on the day time lamp. If it is not the day time key, the system then checks to determine whether the max demand has been actuated for a second time and if so, turns off the max demand lamp and turns on the peak demand indicator lamp.

If it is not the max demand key, the system checks to determine whether it is the display key and if so shifts the key cycle into the next step and turns on the display lamp. If it is not the display key, the system checks to determine whether it is the on key or the off key. If it is either the on or off key, the system checks to determine whether the manual control switch, previously stored, has been actuated to preclude operation of these keys. If the manual control switch has not been actuated and the on or off key has not previously been actuated, the on or off light, depending upon the key actuated, is turned on.

If, the key actuated was a left side key and was the execute key, the system reads the previously stored function key to determine whether it was the control point key, the override key, the alarm allow key or the building system key and implements the function of the key stored.

If it is either a control point key or a control point override key, the system first limits the possible number of points to 64 since the system in the illustrated embodiment is designed to control only 64 control points. The system then reads the number of the control point or the alarm point to make sure that the control or alarm point identified is a proper one and checks to see whether the on key or off key has been actuated. The system executes the control change either by turning the control point on or off, by turning the control point override on or off, or by turning alarm allow on or off, stores that information and sets up the bus scan to implement any control change. The display and all control instructions are then cleared and the system returns to the main control.

If after reading the identity of the control point it is determined that the on/off key has not been actuated, the system shifts to the third state, turns on the error light and compares the display register with the display buffer to rewrite the display register.

If the building system key is actuated, e.g., when it is desired to manually execute any of the building control tables, the system checks to determine whether or not an on or off key has been actuated. When the building system key and the on key are actuated, but no control table number has been identified, the system determines that it is an instruction to execute the building start up table. If the off key and the building system key have been actuated but no control table number has been identified, the system interprets this to mean that the building shut down table is to be executed. If, on the other hand, any other control table is to be executed, it will be identified by number. All tables are executed on or off by storing the address of the corresponding table with the execution instructions in the table command buffer for later execution.

When the display key is actuated, the selected function is displayed. When the execute key is subsequently actuated the display is incremented. If a right side key is actuated, the system does not process it but returns to again read keys. If it is a left side key and it is not the execute key, the system checks to see whether the display key had been actuated and if so checks to determine whether a number key had been actuated. If neither of these is the case, the system again returns to the check keys to read additional key when actuated.

The system then checks to determine whether any information is to be displayed as a result of actuation of the display key. If so, the information to be displayed is loaded or stored into the display register. Next, the system compares the data in the display register with the data in the display buffer. If the information in the two are not the same, the information in the display buffer is updated and that information is written into the data terminal for display as described above.

The system then reads the demand meter. To do this, the system reads the value of the previous meter reading stored in the buffer, reads the current value of the meter by addressing the data accumulator, computes the difference and adds that increment to the demand meter buffer. This information is stored for later processing and computation.

Figure 14:
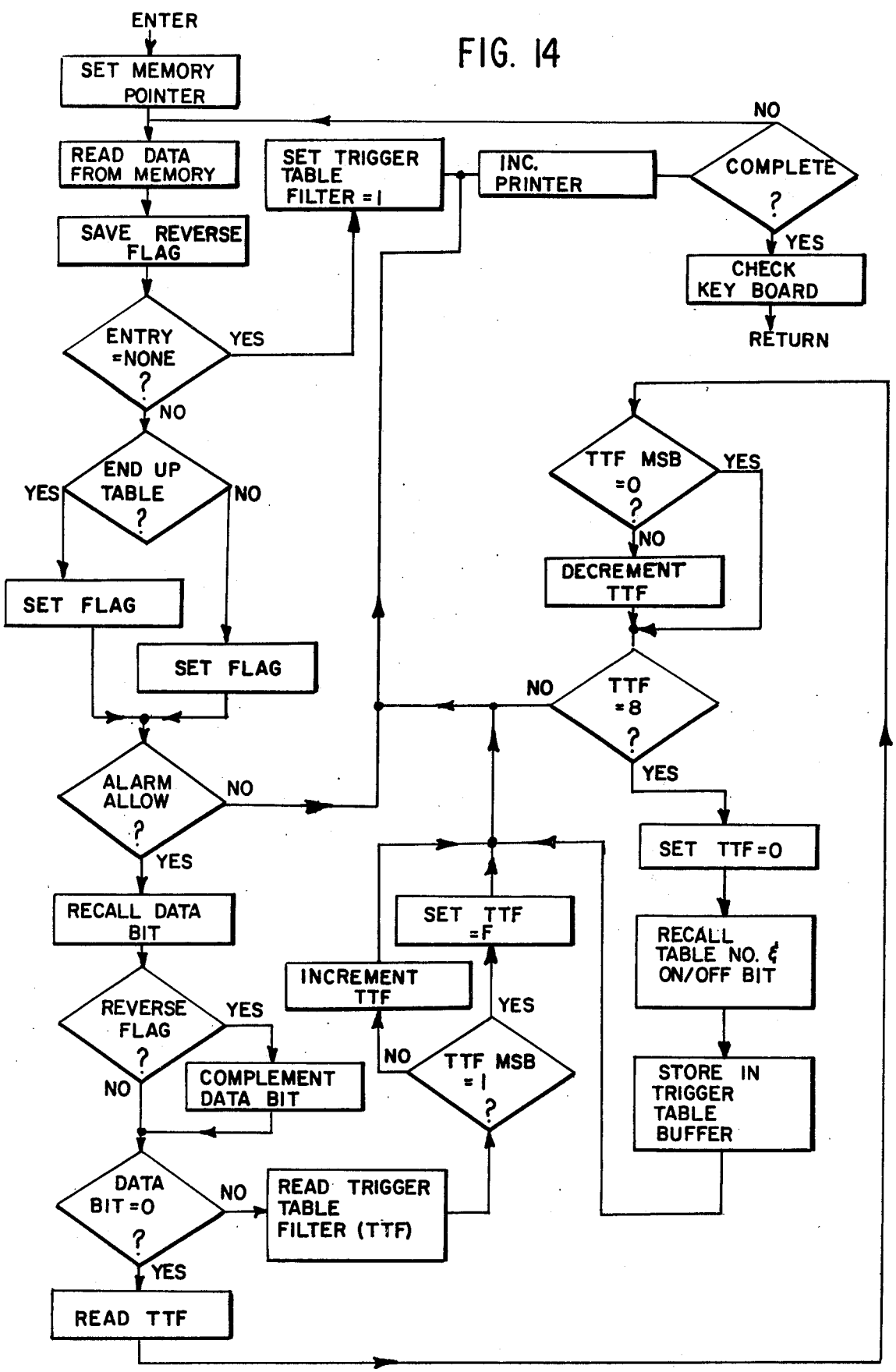

The system then checks to determine whether any alarm points which are to trigger any of the building system tables are in a trigger state, see FIG. 14. The trigger entry for each control table is read sequentially if an entry exists. The system reads whether or not that alarm point has been disabled by the alarm allow key. If the alarm point has not been disabled the system reads the state of the corresponding monitor point, compares it to the particular control table trigger and if the two coincide, stores the table number and whether the table is being turned on or off into the trigger table buffer for later processing. If the particular alarm point is not in a state to trigger the table, the system increments to the next address in the alarm point trigger table stored in the memory and repeats the process until all of the trigger alarm points that are used to trigger any of the control tables have been read and, if appropriate, stored in the trigger table.

The system then checks the memory to see whether any of the emergency control table trigger alarm points have been or are in a condition to trigger the emergency control table, see FIG. 15. The first emergency control table trigger is read from memory and identified. The corresponding alarm point is read. If it is on the system determines whether this had previously been read into the system. If so, nothing further need be done since the emergency control table is already being implemented. If not, the emergency control table flag is set, and the number of emergency control table and the on command is written into the table command buffer in lieu of any control table numbers stored previously which are cleared, since the emergency control table has priority. If none of the alarm points which trigger the emergency control table are on, the emergency control table flag is cleared and the system returns to the main control cycle.

The processing of the control tables and the cycling of the resources is the next to be implemented by the system. Control points are implemented every 20 seconds and resources are cycled each minute. Therefore, before proceeding to implement any control table or resource cycling, the system reads the four second clock and if four seconds have not passed since the last scan the system bypasses the control table and resource cycling step. If four seconds have passed, the four second counter is incremented and the system checks to determine whether 20 seconds have passed since the last scan. Again, if 20 seconds have not passed, the control table and resource cycling steps are bypassed.

Figure 16:
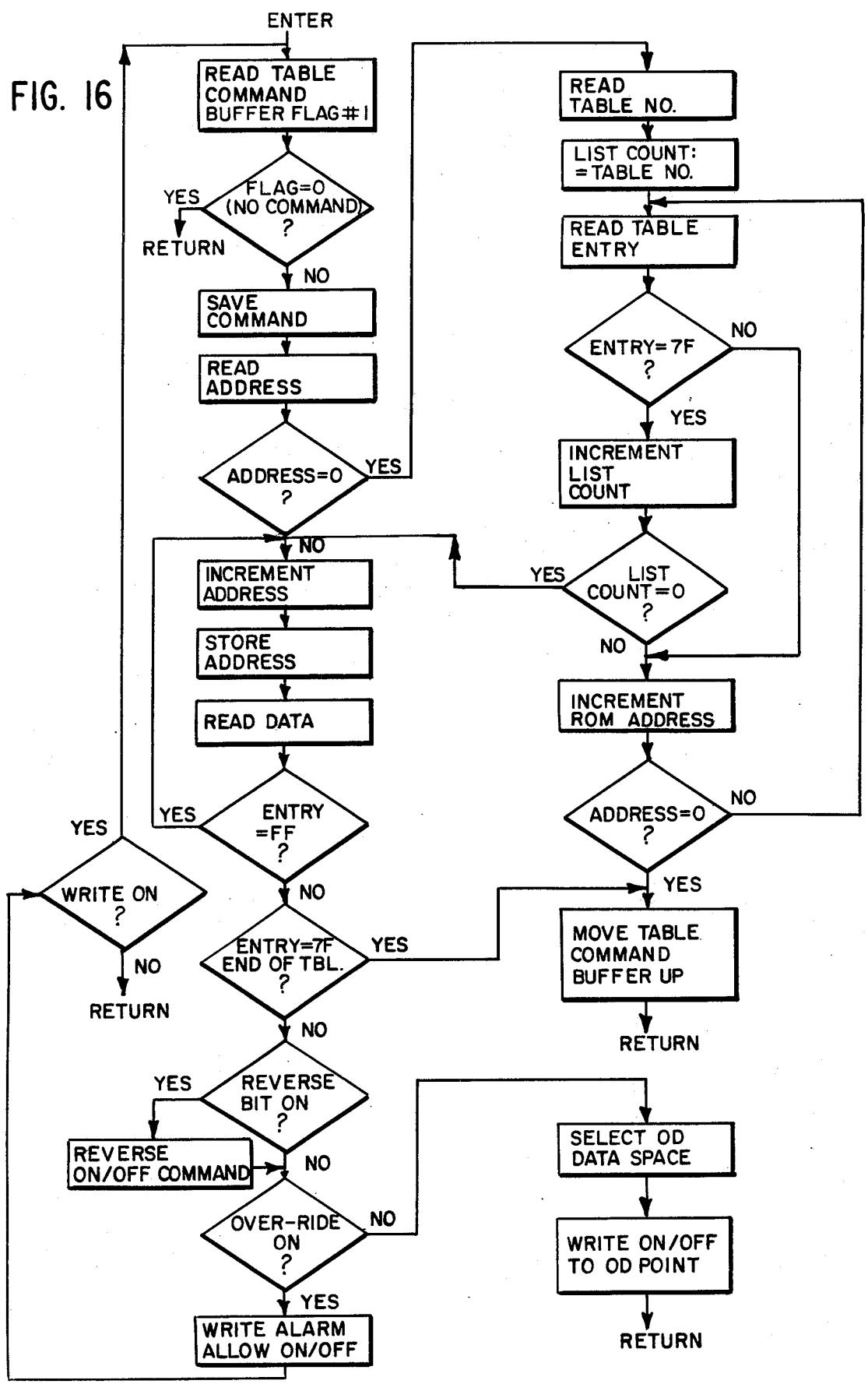

When 20 seconds have passed, the four second counter is reset, the 20 second counter is incremented and the system checks the control table command buffer to determine whether any control table is to be implemented, see FIG. 16. If there is an entry in the table command buffer, the system reads the address of the table. If this is the first time the tables have been addressed, the address is the beginning of the control tables. The inverse of the table number is stored and the table entry is read. Assuming that the table being addressed is table number 4, the system reads the entry at a particular address to determine whether that entry identifies the beginning of the table. If so, it increments the list count and, in the present example, increments it to the number $\overline{3}$. Since the list count is not zero, which means that it is not the table being addressed, the system increments the table address and determines whether the entry at that address identifies an end of table. If not, the system continues to cycle until such time as the beginning of the fourth table is read. At this point, the list count equals zero.

The system then increments the address to read the first control point instruction to be implemented, stores that address and reads the data stored at that address. If the data is a no operation entry, the system recycles to read the entry at the next address and obtain the data from that address. If there is an entry to be implemented, the system checks to see whether it is the control point or control point override to be turned on or off. If it is not an override, the system produces the appropriate control signal with address and stores it in the buffer to be written as a control pulse when the system next produces control pulses applied to the data module.

If the data at the particular address is an override instruction, the system stores this information and returns to the table to implement the data at the next address. Since the next time the check table cycle is scanned, the address will not indicate the beginning of a table, the address will be incremented and the information at the next address will be read and implemented. The tables are checked every twenty seconds which allows sufficient time to not only produce the necessary control pulse but to allow the equipment operated by the control point to be turned on or off as instructed.

The system then checks to determine whether a minute has passed since previously scanned. If so, it resets the twenty-second counter and checks the minute cycle which tests for six minute intervals, updates the day time clock which displays only six minute intervals, tests for the time to execute either the building on or building off control tables which are executed in response to time of day and determines the period of the day.

Since the check minute cycle is initiated only once every minute, the six minute clock is incremented and the time is checked to see whether six minutes has passed since the clock was first incremented. If six minutes have not elapsed, it is not time to implement the minute cycle, the system then checks to see whether any keys have been actuated and stores that data as described above and returns to the main cycle.

Figure 17:
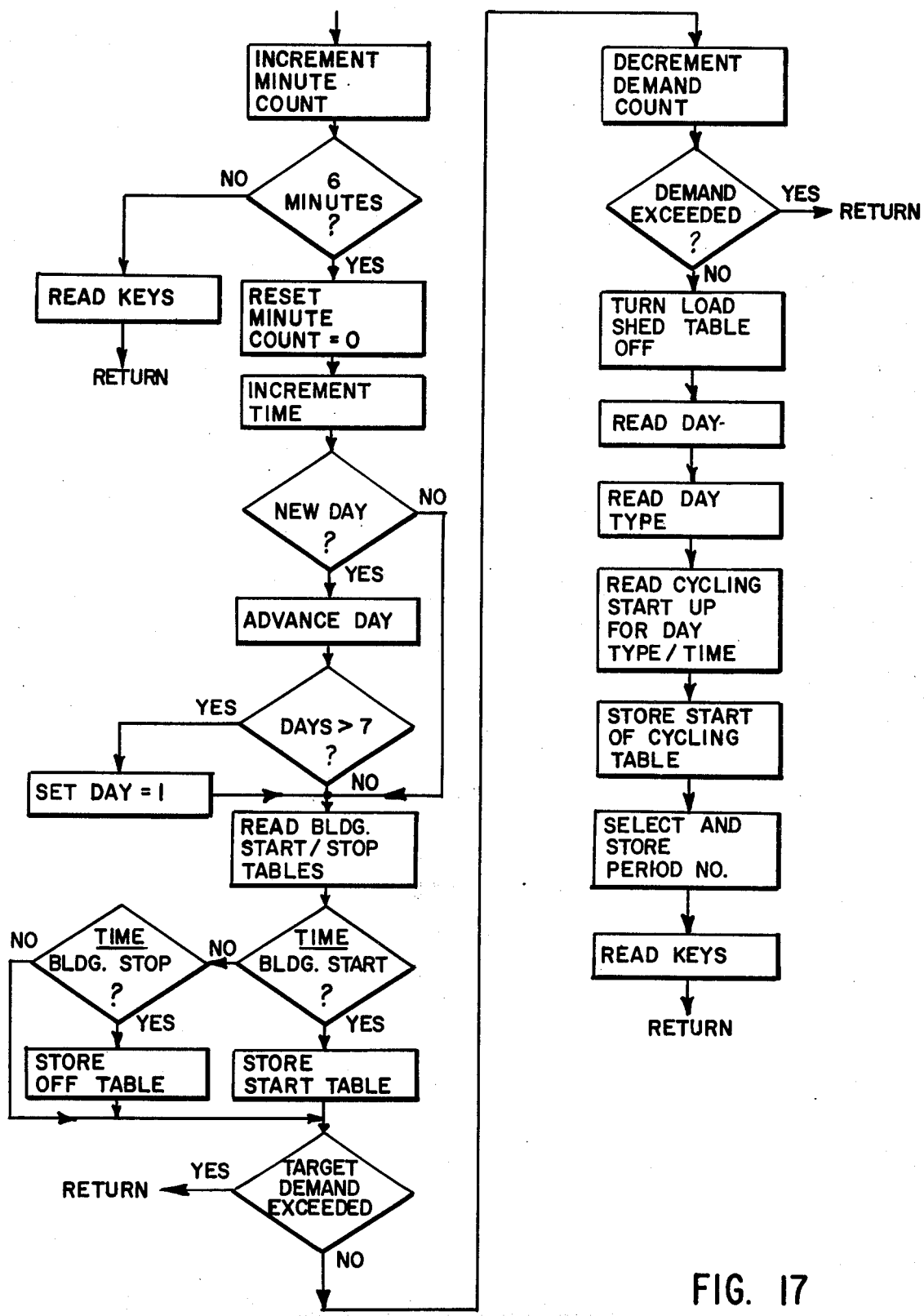

If six minutes have elapsed, the minute counter is reset to zero and the day time clock is incremented, see FIG. 17. The day time clock is read to see whether a new day has occurred. If so, the day is advanced. The day is then read and if the day is greater than seven it is reset to one. If not, it is left unchanged.

The building start table and the building stop table triggers are read to determine whether the current time is one which executes either table. If it is time for the building start table, the system writes into the table buffer the identity of table number one which is the building start table. If it is not time for the building to implement the building start table, the system checks to determine whether it is time to turn the building off by implementing the building off table. If so, table number two is stored in the table buffer for implementation by the check table cycle as indicated above.

Since one of the control tables, e.g., the overload shed table, is implemented when actual demand exceeds target demand, the system next checks to see whether or not the target demand has been exceeded. If so, the minute cycle is aborted and the system returns to the main cycle. If not, the system decrements the demand exceeded count by one and tests for zero. If the count equals zero then the shed table which had been turned on by a demand exceeded action is turned off. In this way, the shed table which is turned on when demand is exceeded is turned off no less than six to twelve minutes following reduction of demand below the target level by delaying execution of the shed table off until the minute program has been scanned twice which occurs once every six minutes.

The system then checks the day type table to determine what strategy is being employed for the current time of the current day. This identifies the strategy table being employed for that strategy. The address of the selected strategy table is obtained for the present time of day. The period number is stored in the buffer memory for later reference.

If the current value exceeds the target demand, the system checks to see whether this is the first time that demand was exceeded. If it is the first time, the address of the load shed table is stored in the table buffer to effectuate execution of that table on in response to demand being exceeded. The demand exceeded bit is set and read into the display buffer so that it can be written into the data terminal to turn on the demand exceeded light. In addition, the extend flag is set so that resource off time will be extended as described below.

Figure 19:
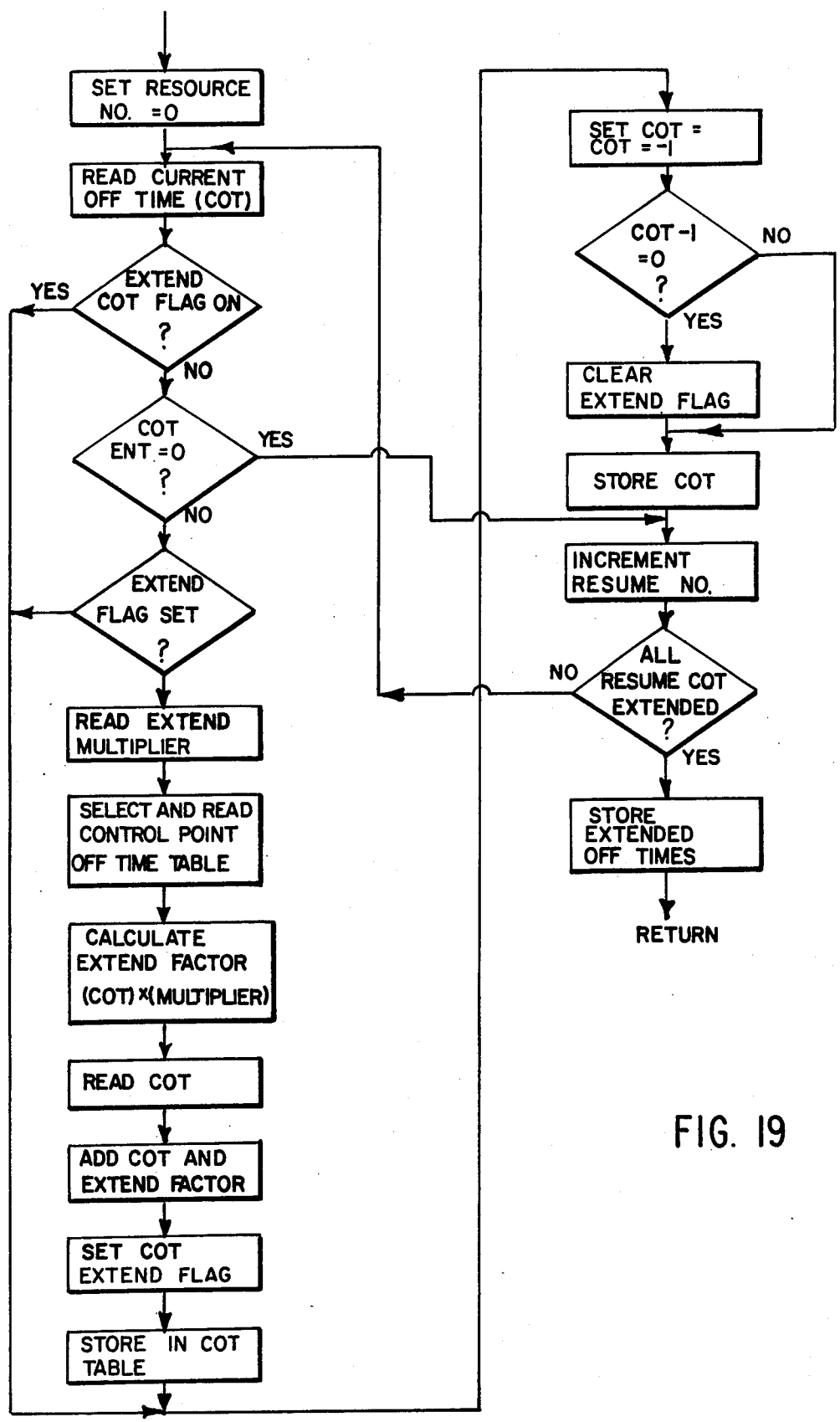

The system next executes the extend/decrease off time cycle, see FIG. 19. Initially, the resource number is set at zero to extend the off times for all of the resources. The current off time is read and if the extend current off time flag is not on, meaning that the off time has not previously been extended, the system checks to see whether current off time entry is "0." If so, the corresponding resource is not being cycled. If the entry is not "0," the resource is being cycled and the extend flag is read and if set, the extend multiplier for that resource is recalled from buffer memory. The amount that the off time is to be extended is to be calculated by multiplying the current off time for the resource by the multiplier and that is added to the current off time. The extend current off time flag is then set and the extended off time is stored in the current off time table. The current off time is then decremented by one to see whether or not the extended current off time would be turned on the next cycle and if so the extend flag is cleared for this resource. The current off time is then stored and the resource number is incremented and the cycle is repeated.

as determined by the extend current off time flag being turned on, the off time extend calculation is bypassed. This bypass also occurs if the current off time table entry is equal to "0" or if the extend flag produced by the demand meter calculating cycle is not set. Thus, for each main cycle, the extend/decrease cycle is implemented in which all resources that are on are returned to their standard off times and all resources that are off are extended if the extend flag has been set during the demand meter calculation.

Figure 20:
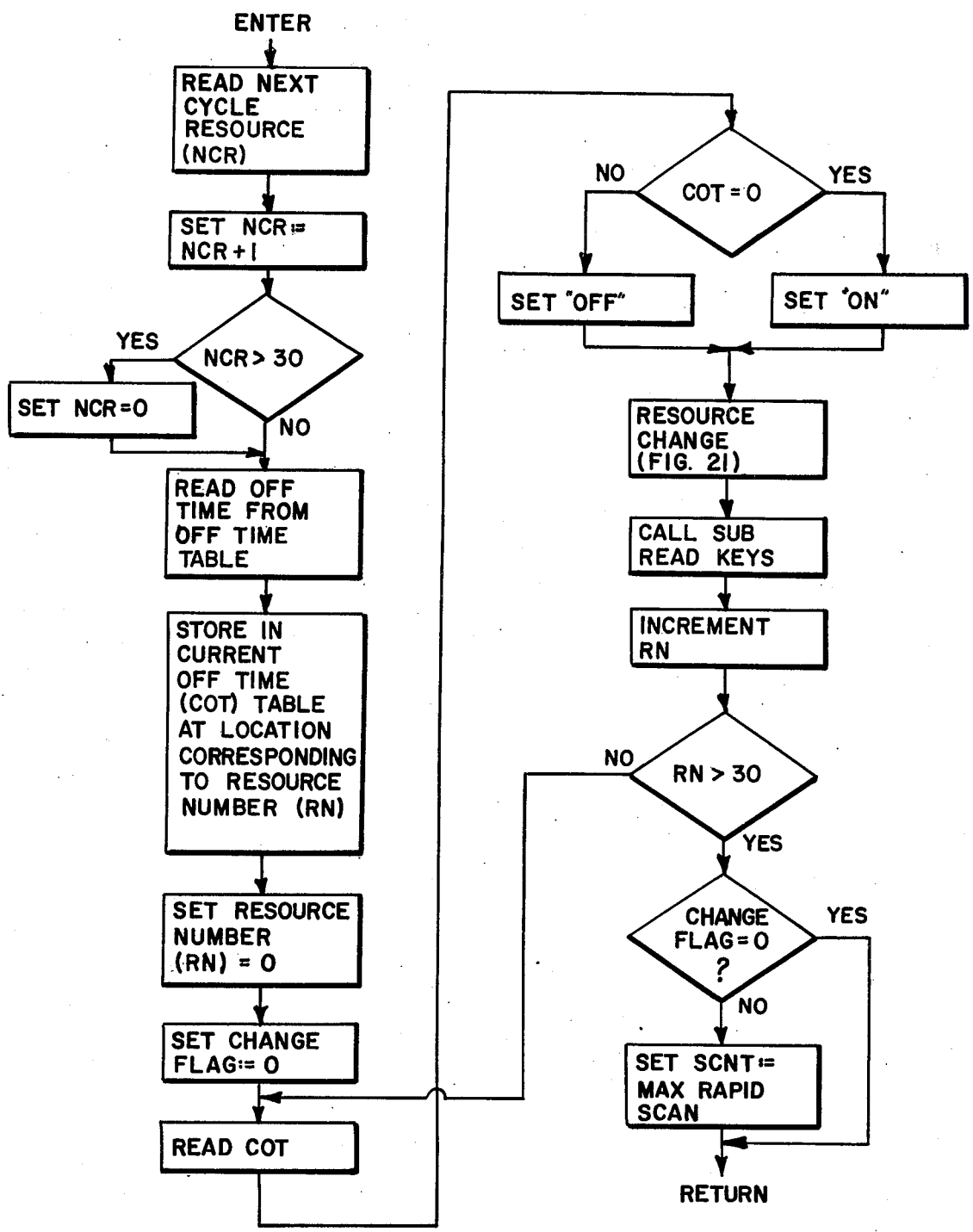

The system then cycles the next resource by entering the next resource cycle, FIG. 20. The next resource to be cycled is read and the resource number is incremented. If the resource number is in excess of thirty, it indicates that that is the last resource to be cycled and resets the next resource to zero for the next cycle. The current off time is read from the off time table and stored in the current off time table at the location corresponding to the resource number being cycled.

The system then checks to see whether any changes in the resource have occurred by setting the resource number to zero and the change flag to zero. The current off time for the resource is read and off and on flags are set representing whether the resource is on or off. The system then checks to see whether any changes have occurred in the current resource such as whether any of the control points forming that resource are being overridden.

Figure 21:
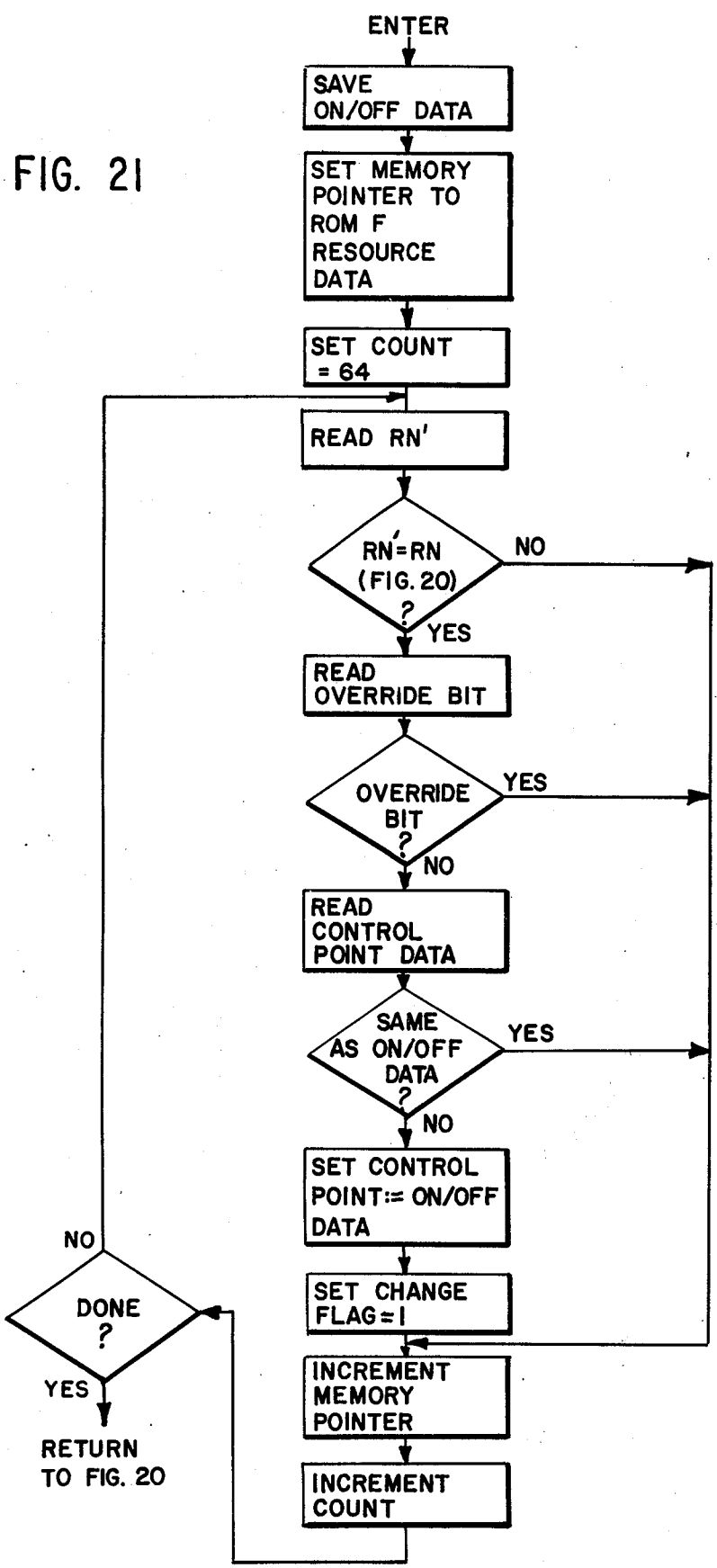

The resource change cycle, FIG. 21, scans each of the resources and compares the number of the resource scanned to the resource being cycled. When the resources are the same, the system checks each control point forming that resource, determines whether there is an override and whether the control point status is to be changed. If the status of the control point is the same as the current on/off flags, the system is incremented to the next control point forming the resource. If the status of the control point is not the same as the set flags, the control point status is changed to be the same as the on/off data, and the change flag is set to one.

Once all of the control points have been scanned and those corresponding to the resource have been tested and the status changed, the system returns to the next resource cycle, reads and stores any keys that have been actuated and increments the resource number. When changes to all of the resources have been so scanned, the system checks to determine whether any changes have occurred by reading the change flag. If changes have occurred, the scan count is set to effect a more rapid execution of the indicated changes.

Figure 22A:
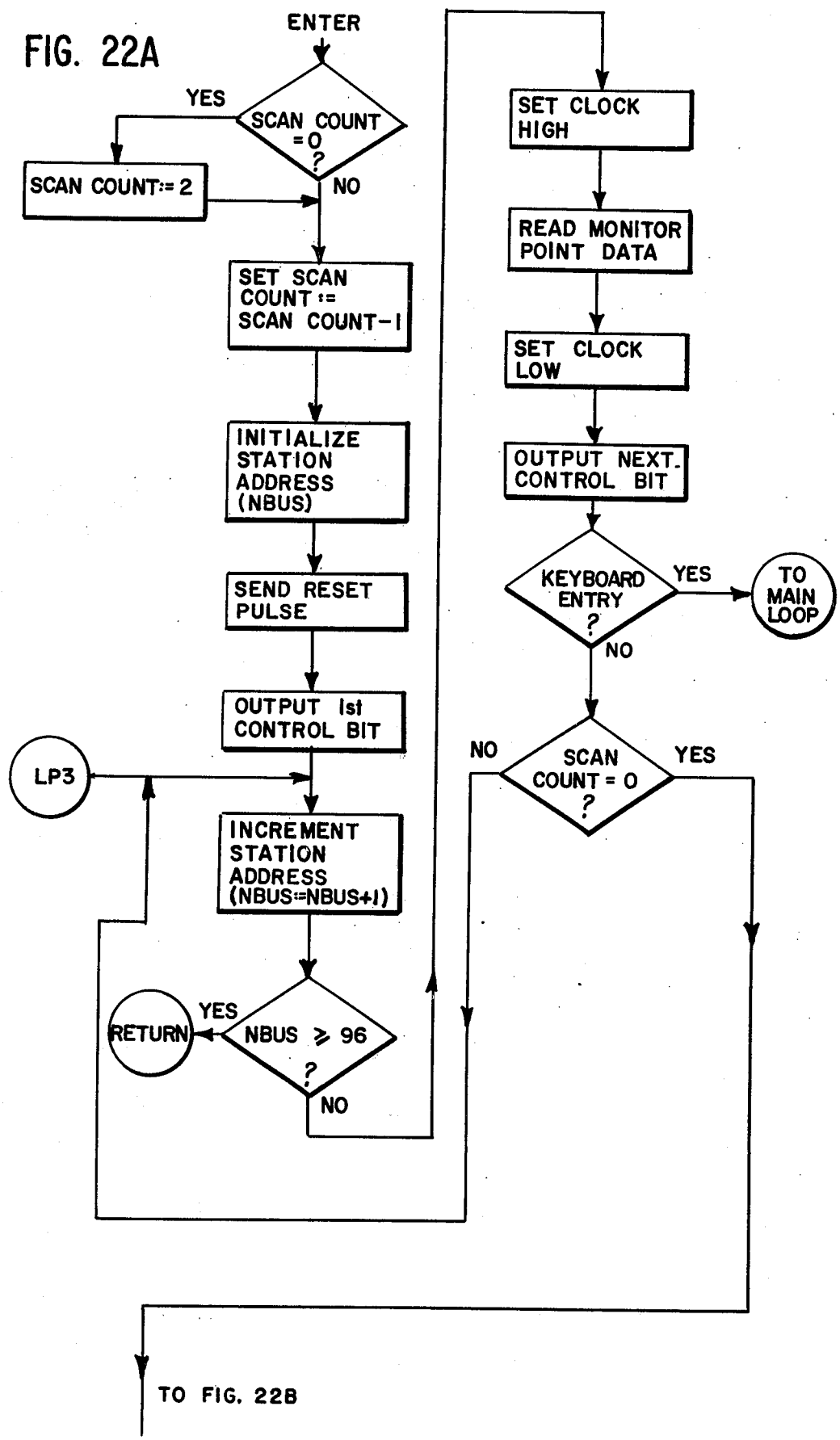

Next, the main cycle initiates the bus cycle for producing the necessary control bit signals to the various control points and for reading the status of alarm points, see FIG. 22. If the scan count is zero, it is reset to two and decremented by one. The system then produces an initialized address, sends a reset pulse and outputs the first control bit. The address is incremented to address the first control point and the system checks to see whether ninety-six addresses have been scanned. If not, the clock pulse goes high, the monitoring point data is read from any monitoring point being addressed and the clock goes low. The next control bit is produced and the system checks to see whether any key has been actuated and if so returns to the main loop at that point.

If no key has been entered and this is not the last scan, the system recycles to increment the address and continue to output control bits and read the status of monitoring points until all of the control points and all of the monitoring points have been addressed. The system then returns to the main cycle.

The next time the system implements the bus cycle, the scan count is decremented to zero. For each monitor point, the system checks to see whether it is or is not an alarm point and checks to see whether it is a verification point. If it is, the system compares the status of that monitoring point with the control point or monitoring point which it is verifying. If the alarm point is different from the control point or monitor point to which it is compared, the error flag is set. If this particular alarm point is not to be an alarm, the error flag is cleared.

The alarm buffer is then read and compared to the alarm flag. If they are the same, the alarm flag is checked to see whether it is the same as the error flag. If not, and the alarm flag is on, it is turned off. If the alarm flag is off, it is turned on and the horn flag is turned on.

If the alarm buffer is not the same as the alarm flag or if the alarm flag is the same as the error flag, the alarm buffer is set to be the same as the error flag. The alarm flag is then checked and if it is on the system checks to see whether the alarm has been acknowledged. If it has not been acknowledged, the new alarm flag is turned on if it was not previously on. If the alarm flag is not set, then the alarm alarm acknowledge is cleared. The system then returns to increment the address and read data from the next monitoring point and the cycle is repeated.

Thus, there has been described a self-contained, relatively inexpensive, flexible, multi-purpose and multi-function energy control system capable of providing a wide variety of energy control management and monitoring services. The system is capable of providing a variety of information regarding the status of various control and monitoring points within the system, is capable of automatically implementing a response to preselected conditions, selected tables for turning selected control points on or off and for cycling groups of control points in accordance with any one of a number of strategies as a function of the time and day, all of which can be selectively chosen for implementation by the system. The system is capable of reducing electrical demand in response to various conditions by turning selected loads off and by extending the duration of time for which the various loads are cycled off.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. For a facility of the type having plural energy consuming loads, a self-contained energy management system for sensing and selectively controlling the energization of said loads comprising:

means coupled to each of a first plurality of said loads for producing control signals to selectively energize and deenergize each of said first plurality of loads;

means coupled to each of a second plurality of said loads for selectively sensing the state of energization of each of said second plurality of loads and for producing sensing signals indicative of the state of energization of each of said second plurality of loads;

means responsive to production of selected ones of said sensing signals representative of selected preset conditions for effecting operation of said control signal means to produce selected ones of said control signals as a function of the selected sensing signal produced, whereby the existence of each of said plurality of preset conditions results in energization and deenergization of certain ones of said first plurality of loads;

load cycling control means responsive to each of a plurality of preselected cycling control conditions for producing cycling control signals representative of each of said cycling control conditions;

load cycling means responsive to each of said cycling control signals for effecting repetitive operation of said control signal means to cyclically energize and deenergize selected ones of said first plurality of loads in cycling patterns determined in response to said load cycling control signal; and means for modifying each of said cycling patterns in response to additional preselected conditions.

2. A system as claimed in claim 1 including:

means for measuring energy used in the facility and for producing energy demand signals having values representative thereof; and means responsive to said energy demand signals for determining energy used in a selected time interval and for producing a total demand signal representative thereof, said cycling pattern modifying means being responsive to said total demand signal exceeding a preselected value for effecting said modification of said cycling patterns.

3. A system as claimed in claim 2, wherein:

said load cycling means is operative to effect repetitive deenergization of each of said selected ones of said first plurality of loads for a selected portion of each of a plurality of preset time intervals; and said cycling pattern modifying means effecting said modification of said cycling patterns by extending the duration of said time interval portion by an amount that is determined as a function of the value thereof.

4. A system as claimed in claim 3 wherein:

said selected ones of said first plurality of loads are divided into groups, each of said groups comprising at least one of said selected ones of said first plurality of loads;

said load cycling means effecting said cyclical energization and deenergization of the loads of each group substantially simultaneously and effecting said cyclical energization and deenergization of each of said groups of loads sequentially.

5. A system as claimed in claim 1 wherein:

said sensing signal responsive means is further responsive to said produced sensing signal for producing cycle inhibit signals for certain ones of said first plurality of loads; and said load cycling means includes means responsive to said cycle inhibit signals for precluding said load cycling means for cyclically deenergizing and energizing the loads corresponding to said inhibit signals.

6. A self-contained energy and facility management system for controlling the energization and deenergization of a plurality of external energy consuming loads comprising:

means producing a time based output having values representative of major time periods and time based segments thereof;

means responsive to a value of said time based output representative of a preselected time based segment for energizing selected ones of said loads in a predetermined sequence;

means responsive to said time based output for selecting different ones of a plurality of load cycling patterns as a function of different preselected values of said time based output, said load cycling patterns being operative to deenergize loads for a portion of each of a plurality of preset time intervals;

load cycling means responsive to said time based output for periodically and cyclically deenergizing and energizing selected ones of said loads in accordance with said selected one of said plurality of cycling patterns, whereby said loads are cycled differently in accordance with patterns that are changed as a function of time; and means for selectively modifying each of said cycling patterns for each of said loads.

7. A system as claimed in claim 6 wherein:

said load energizing means is responsive to said time based output for energizing said selected ones of said loads in said predetermined sequence in response to selectably different values of said time based output representative of different time segments for each major time period.

8. A system as claimed in claim 7 including:

manually operable means for selecting said different values of said time based output for each of said major time periods.

9. A system as claimed in claim 6 wherein:

said cycling pattern selecting means selects said cycling patterns in response to the selectively different values of said time based output representative of each different major time period, whereby said cycling patterns may be selected differently for each major time period.

10. A system as claimed in claim 6 including:

means responsive to a second value of said time based output representative of another preselected time based segment for deenergizing selected ones of said loads in accordance with another predetermined sequence.

11. A self-contained energy and facility management and system for controlling the energization and deenergization of a plurality of external loads comprising:

means producing a time based output representative of a major time period and time based segments thereof;

load cycling means responsive to first selected values of said time based output for cycling selected ones of said loads on and off in accordance with one of a plurality of selected patterns, and responsive to a second value of said time based output for cycling said selected ones of said loads on and off in accordance with another one of said plurality of predetermined patterns;

energy usage indicating means for producing signals representative of the rate of energy usage;

means for storing said energy rate signals;

means responsive to said time based outputs for periodically sampling said storing means to obtain the value of the stored energy rate signals;

means for storing the values of a selected number of said sampled energy rate signals and providing an output indicative of the total value of such stored samples;

means for comparing said total value output with a selected maximum value; and means for modifying the cycling pattern of said cycled loads in response to said total value output exceeding said selected maximum value, said cycle modifying means including means for extending the time period said loads are cycled off by a selected amount determined in part by the off period of said cycling pattern of said load.

12. A self-contained energy and facility management system for controlling the energization and deenergization of a plurality of external loads comprising:
- means producing a time based output representative of a major time period and time based segments thereof;
- load cycling means responsive to said time based output of said clock means representative of preselected ones of said time segments for cycling selected predetermined groups of loads on and off in accordance with one of a plurality of selectable patterns;
- transducer means responsive to the state of energization of each of a selected plurality of said loads for providing a state indicative of the state of said load; and
- means responsive to selected ones of said state signals for inhibiting cycling of selected individual ones of said loads within said load groups to preclude cycling of said individual loads.

13. A system as claimed in claim 12 including:
- means responsive to said time based output being representative of a selected said time based segment for energizing selected individual ones of said loads in a predetermined sequence.

14. A system as claimed in claim 12 wherein:
- load cycling means is responsive to said time based output being representative of one of said preselected ones of said time segments for cycling predetermined groups of loads on and off in accordance with one of said plurality of selectable patterns and responsive to said time based output being representative of selected additional ones of said time segments for cycling said predetermined groups of loads on and off in accordance with another one of said plurality of selectable patterns.

15. For a facility of the type having plural energy consuming loads, a self-contained energy management system for sensing and selectively controlling the energization of said loads comprising:
- means coupled to each of a plurality of said loads for selectively sensing the state of energization of each of said plurality of loads and for producing sensing signals indicative of the state of energization of each of said second plurality of loads;
- means for identifying selected ones of said sensing signals as indicative of an alarm condition;
- means responsive to said alarm signals for displaying the identity of the load producing one of said alarm signals and for producing an alarm indicator signal;
- manually actuatable means for acknowledging said displayed alarm load; and
- means responsive to acknowledgement of said displayed alarm load for displaying the identity of another load producing an alarm signal.

* * * * *

UNITED STATES PATENT AND TRADEMARK OFFICE
CERTIFICATE OF CORRECTION

PATENT NO. : 4,153,936

DATED : May 8, 1979

INVENTOR(S) : William D. Schmitz, Richard H. Turpin, Robert A. Dashiell and Chris L. Hadley It is certified that error appears in the above-identified patent and that said Letters Patent are hereby corrected as shown below:

Column 7, line 21: "19" (2nd complete paragraph) should be

-- 39 --.

Column 14, line 17: "or" should be

-- on --.

Column 18, after line 58: (1st line of last paragraph missing) should be

-- If a resource off time had previously been extended, --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*